(12) United States Patent
Kamekawa

(10) Patent No.: US 10,610,771 B2
(45) Date of Patent: Apr. 7, 2020

(54) PROGRAM, METHOD, AND SYSTEM OF TRANSMITTING OR RECEIVING MESSAGE

(71) Applicant: Gree, Inc., Tokyo (JP)

(72) Inventor: Yusaku Kamekawa, Tokyo (JP)

(73) Assignee: Gree, Inc., Tokyo (JP)

( * ) Notice: Subject to any disclaimer, the term of this patent is extended or adjusted under 35 U.S.C. 154(b) by 0 days.

(21) Appl. No.: 16/507,856

(22) Filed: Jul. 10, 2019

(65) Prior Publication Data

US 2019/0329131 A1    Oct. 31, 2019

Related U.S. Application Data

(63) Continuation of application No. 14/446,002, filed on Jul. 29, 2014, now Pat. No. 10,391,388.

(30) Foreign Application Priority Data

Jul. 30, 2013    (JP) .................................. 2013-157971

(51) Int. Cl.
*A63F 13/50*        (2014.01)
*A63F 13/795*       (2014.01)
(Continued)

(52) U.S. Cl.
CPC .............. *A63F 13/12* (2013.01); *A63F 13/50* (2014.09); *A63F 13/795* (2014.09); *A63F 13/87* (2014.09);
(Continued)

(58) Field of Classification Search
CPC ........ A63F 13/50; A63F 13/795; A63F 13/87; A63F 13/88; A63F 2300/572; H04L 51/046
See application file for complete search history.

(56) References Cited

U.S. PATENT DOCUMENTS 5,791,987 A    8/1998 Chen
5,927,714 A    7/1999 Kaplan
(Continued)

FOREIGN PATENT DOCUMENTS

JP    2005-211605 A    8/2005
JP    2011-15715 A     1/2011
(Continued)

OTHER PUBLICATIONS

Ring it—Free calls/Chat: multifunctional messenger in which moving stamps can be used. Furthermore, video call can be used. Free., AppBank, Jul. 27, 2012. URL <http://www.appbank.net/2012/07/27/iphone- application/447779.php>.
(Continued)

*Primary Examiner* — David L Lewis
*Assistant Examiner* — Matthew D Hoel
(74) *Attorney, Agent, or Firm* — Oblon, McClelland, Maier & Neustadt, L.L.P.

(57) ABSTRACT

A controller receives a message from a first user terminal of user terminals belonging to a chat group. In a case where the type of the message is of a normal message, the controller transmits the message to each of the user terminals. In a case where the type of the message is selection of the game icon, the controller generates a game message according to logic corresponding to the game icon and transmits the game message to each of the user terminals.

18 Claims, 24 Drawing Sheets

(51) Int. Cl.
  *A63F 13/87* (2014.01)
  *A63F 13/88* (2014.01)
  *H04L 12/58* (2006.01)
  *A63F 13/30* (2014.01)

(52) U.S. Cl.
  CPC ............ *A63F 13/88* (2014.09); *H04L 51/046* (2013.01); *A63F 2300/572* (2013.01)

(56) References Cited

U.S. PATENT DOCUMENTS

| | | | |
|---|---|---|---|
| 6,213,873 B1 | 4/2001 | Gasper | |
| 6,254,098 B1 | 7/2001 | Kirkpatrick | |
| 6,585,264 B2 | 7/2003 | Benett | |
| 6,916,247 B2 | 7/2005 | Gatto | |
| 7,410,418 B2 | 8/2008 | Potter | |
| 7,497,439 B2 | 3/2009 | Leupp | |
| 8,025,570 B2 | 9/2011 | Labrie | |
| 8,087,672 B2 | 1/2012 | Malobabic | |
| 8,109,820 B2 | 2/2012 | Nagel | |
| 8,250,476 B2 | 8/2012 | Hamilton, II | |
| 8,271,962 B2* | 9/2012 | Muller | G06F 17/271 717/134 |
| 8,272,961 B2 | 9/2012 | Busey | |
| 8,282,458 B2 | 10/2012 | Reynolds | |
| 8,303,416 B1 | 11/2012 | Thakkar | |
| 8,328,644 B2 | 12/2012 | Busey | |
| 8,342,967 B2 | 1/2013 | Thakkar | |
| 8,348,765 B1 | 1/2013 | Thakkar | |
| 8,357,405 B2 | 1/2013 | Schmitz | |
| 8,366,546 B1 | 2/2013 | Naik | |
| 8,379,540 B2 | 2/2013 | Gill | |
| 8,535,134 B2 | 9/2013 | Katz | |
| 8,579,108 B2 | 11/2013 | Tanbo | |
| 8,602,875 B2 | 12/2013 | Nguyen | |
| 8,622,828 B1 | 1/2014 | Harrington | |
| 8,636,583 B2 | 1/2014 | Bigelow, Jr. | |
| 8,734,243 B2 | 5/2014 | Harrington | |
| 8,754,905 B2* | 6/2014 | Mahajan | G06T 11/60 345/619 |
| 8,821,297 B1 | 9/2014 | Nagata et al. | |
| 8,834,277 B2* | 9/2014 | Perry | A63F 13/10 463/42 |
| 8,986,116 B1 | 3/2015 | Harrington | |
| 9,295,914 B2 | 3/2016 | Almog | |
| 9,305,328 B2* | 4/2016 | Mahajan | G06T 11/60 |
| 9,415,305 B2 | 8/2016 | Cudak | |
| 9,486,709 B1 | 11/2016 | Lan | |
| 9,533,217 B2 | 1/2017 | Naik | |
| 9,586,139 B2 | 3/2017 | Jabara | |
| 9,682,315 B1 | 6/2017 | Miller | |
| 9,682,324 B2 | 6/2017 | Bansi | |
| 9,811,979 B2 | 11/2017 | Ma | |
| 9,895,609 B2 | 2/2018 | Miller | |
| 9,968,849 B1 | 5/2018 | Lan | |
| 2002/0086732 A1 | 7/2002 | Kirmse | |
| 2005/0266925 A1 | 12/2005 | Hornell | |
| 2006/0030959 A1 | 2/2006 | Duhamel | |
| 2009/0149248 A1 | 6/2009 | Busey | |
| 2009/0208181 A1* | 8/2009 | Cottrell | G11B 27/034 386/278 |
| 2009/0240659 A1* | 9/2009 | Ganz | A63F 13/12 |
| 2009/0243218 A1 | 10/2009 | Schlumbrecht | |
| 2009/0297118 A1 | 12/2009 | Fink | |
| 2010/0035685 A1* | 2/2010 | Cha | A63F 13/10 463/35 |
| 2010/0160038 A1 | 6/2010 | Youm | |
| 2011/0028208 A1* | 2/2011 | Hodgetts | A63F 13/537 463/29 |
| 2011/0087967 A1* | 4/2011 | Ganz | A63F 13/12 715/747 |
| 2012/0009997 A1 | 1/2012 | Youm | |
| 2012/0013622 A1* | 1/2012 | Mahajan | G06T 11/60 345/501 |
| 2012/0110455 A1* | 5/2012 | Sharma | G06Q 10/101 715/719 |
| 2012/0134651 A1* | 5/2012 | Cottrell | G11B 27/034 386/278 |
| 2012/0278739 A1* | 11/2012 | McClarren | A63F 13/35 715/757 |
| 2013/0156137 A1 | 6/2013 | Higuchi | |
| 2014/0128147 A1 | 5/2014 | Yu Cheng | |
| 2014/0187314 A1* | 7/2014 | Perry | A63F 13/10 463/29 |
| 2014/0187315 A1* | 7/2014 | Perry | A63F 13/10 463/29 |
| 2014/0194207 A1* | 7/2014 | Yim | A63F 13/12 463/40 |
| 2014/0253568 A1* | 9/2014 | Mahajan | G06T 11/60 345/522 |
| 2016/0232738 A1 | 8/2016 | Daly | |
| 2018/0229127 A1* | 8/2018 | Nahari | A63F 13/12 |

FOREIGN PATENT DOCUMENTS

| | | |
|---|---|---|
| JP | 2012-93836 A | 5/2012 |
| JP | 2013-094304 | 5/2013 |
| JP | 2014-004134 A | 1/2014 |
| JP | 2014-217486 A | 11/2014 |

OTHER PUBLICATIONS

Communication App "comm" starts providing "Talk Game", a game enjoyable on talk view from today. More enjoyable communicate with President (card game), Mahjong and Poker. Press release, DeNA Co., Ltd., May 29, 2013, URL <http://dena.com/jp/press/2013/05/29/1>.

Convenient free calls anytime, anywhere. Chat app "Ring it!", PR Times, Jul. 20, 2012, URL<http://prtimes.jp/main/html/rd/p/000000087.000002943.html> (English explanation not provided).

Played "Comm (komu) in which President/ Mahjong / Poker are enjoyable on the talk view" as disputatiously reviewed, AppReview, Jun. 3, 2013, URL <http://app-review.jp/android/133270> (English explanation not provided).

Office Action dated Feb. 3, 2015 in Japanese Patent Application No. 2013-157971, with English-language translation, 17 pages.

Office Action dated May 26, 2015 in Japanese Patent Application No. 2013-157971, with English-language translation, 9 pages.

* cited by examiner

PROGRAM, METHOD, AND SYSTEM OF TRANSMITTING OR RECEIVING MESSAGE

RELATED APPLICATIONS

This Application is a continuation of U.S. application Ser. No. 14/446,002, filed Jul. 29, 2014, which claims the benefit of Japanese Patent Application No. 2013-157971, filed Jul. 30, 2013. The entire contents of both of which are incorporated herein by reference.

BACKGROUND OF THE INVENTION

The present invention relates to a technology in which messages are transmitted or received using an information processing terminal.

In recent years, there have been provided chat services, in which computer terminals such as smart phones are used (for example, "Tellit," which is provided through Google Play™ and iTunes® by GREE, Inc:
URL: https://play.google.com/store/apps/details?id=net.gree.android.app.messenger&hl=ja,
URL: https://itunes.apple.com/app/id581075146).

In a chat service, users communicate messages to each other in real time. In detail, a user converses with other users registered in a group by exchanging messages, that is, does chatting. In such a chat service, the users converse with each other using texts or designed illustrations called "stickers."

Further, various types of content (for example, games) are provided through a network. A part of such content can be shared with a plurality of users. For example, in a game such as a social game in which a plurality of users can participate, a user can play a match against other users or play the game in cooperation with each other (See, e.g., Japanese Laid-Open Patent Publication No. 2013-94304).

In a chat according to the conventional art, a user's input text or selected sticker is displayed on a timeline view of the terminals of all participants in the chat in the order of sending. In this case, the messages can be output to the terminals just as a user's intention. On the other hand, however, it is difficult to perform a varied communication. Further, pauses in face-to-face communications can be filled by adding time-killing elements and game elements to the communication. Even in this case, it is difficult to achieve a smooth communication only by transmitting a given text or sticker in the chat.

In order to improve communication, a game application can be used together with a communication correspondent. In this case, however, the user needs to log out of the chat. That is, it is necessary to stop the chat on a chat application and use a game application other than the chat application. For this reason, it is difficult for the user to use the game application without terminating the chat.

SUMMARY OF THE INVENTION

Accordingly, it is an objective of the invention is to provide a program, a method, and a system of communicating a message in order to achieve variety of communication in chatting.

To achieve the foregoing objective and in accordance with one aspect of the present invention, a non-transitory computer-readable medium is provided that stores a program for executing a method. A controller receives a message from a first user terminal of user terminals belonging to a chat group. If the type of the received message is of a normal message, the controller transmits the message to each of the user terminals belonging to the chat group. If the type of the received message is a selection of the game icon, the controller generates a game message according to a game logic corresponding to the game icon, and transmit the generated game message to each of the user terminals belonging to the chat group.

In accordance with another aspect, a method is provided. A controller receives a message from a first user terminal of user terminals belonging to a chat group. When the type of the received message is of a normal message, the controller transmits the message to each of the user terminals belonging to the chat group. When the type of the received message is selection of the game icon, the controller generates a game message according to a game logic corresponding to the game icon, and transmits the generated game message to each of the user terminals belonging to the chat group.

In still another aspect, a system is provided. The system includes a controller. The controller receives a message from first user terminal of user terminals belonging to a chat group. When the type of the received message is of a normal message, the controller transmits the message to each of the user terminals belonging to the chat group. When the type of the received message is selection of the game icon, the controller generates a game message according to a game logic corresponding to the game icon, and transmits the generated game message to each of the user terminals belonging to the chat group.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a first embodiment of a system which communicates a message will be described with reference to FIGS. 1 to 3. In the embodiment, there is provided a game icon that outputs messages (stickers) in a chat service of transmitting/receiving the messages between a plurality of users (terminals). The display mode of the message varies depending on the situation.

Figure 1:
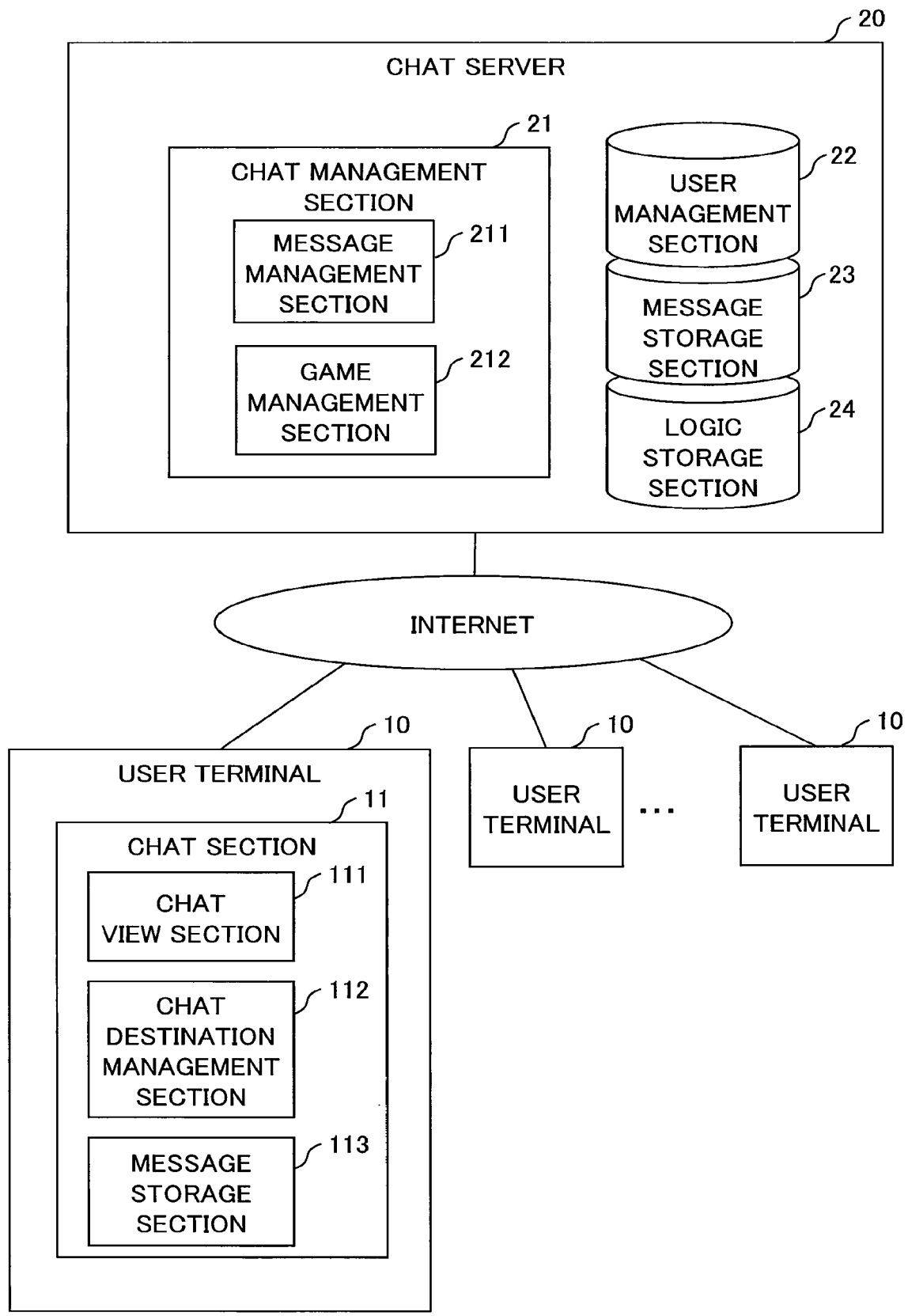
FIG. 1 is a diagram schematically illustrating a system according to one embodiment.
Figure 2:
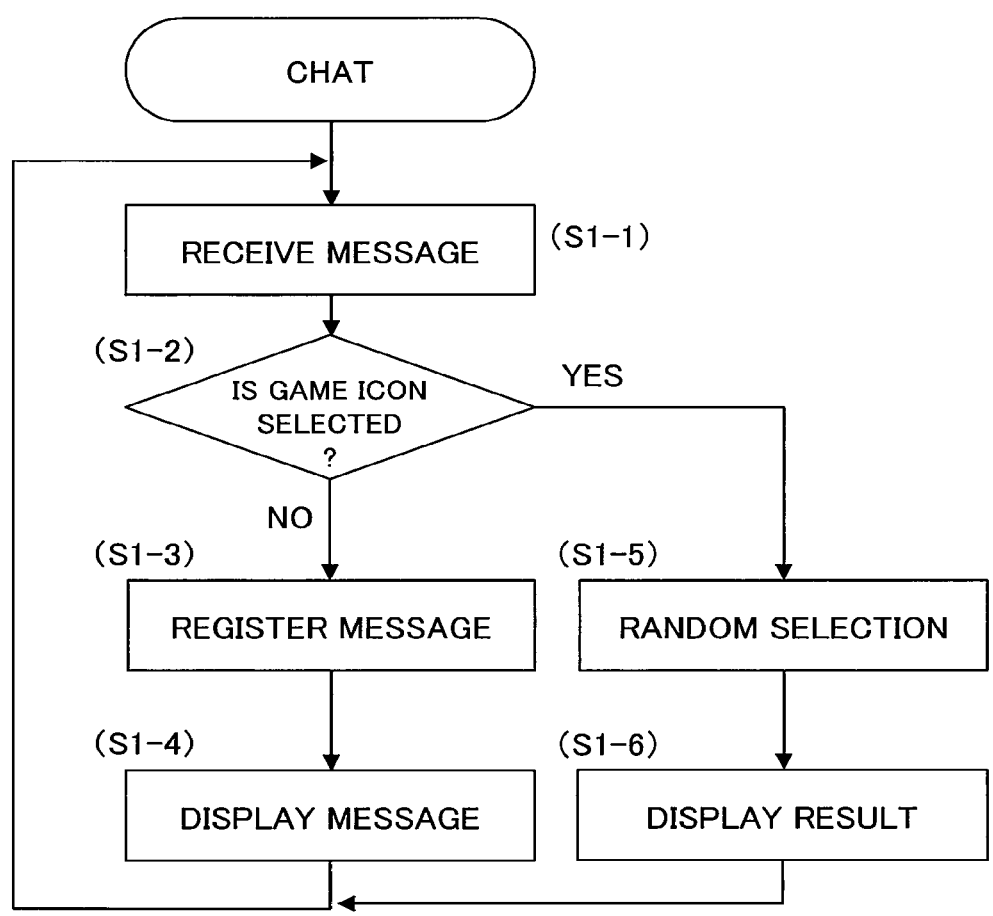
FIG. 2 is a diagram for describing a procedure of the system of FIG. 1 according to a first embodiment.

As illustrated in FIG. 1, user terminals 10 and a chat server 20 are used in the system according to the embodiment. The user terminals 10 and the chat server 20 are connected through a network such as the Internet.

The user terminal 10 is a computer terminal (an information processing terminal such as a smart phone) of a user who uses the chat service. In a case where the user uses the chat service for the first time, the user accesses the chat server 20 using the user terminal 10, downloads a chat application program into the user terminal 10, and installs the program in the user terminal 10.

The user terminal 10 includes a controller provided with a CPU, a RAM, a ROM and the like, a memory for storing data, and an input/output unit for various types of information. The controller executes the chat application program to serve as a chat section 11. In the embodiment, a touch panel display is used as the input/output unit.

The chat section 11 serves as a message processing section. The chat section 11 includes a chat view section 111, a chat destination management section 112, and a message storage section 113.

The chat view section 111 outputs a message, which is transmitted or received in the chat service, to a timeline view, which is displayed on the touch panel display. The chat view section 111 includes a transmission processing unit and a reception processing unit. The transmission processing unit displays a message input through the touch panel display as a comment of the user of the user terminal 10 (that is, the message is displayed as a user's own comment), and transmits the message to the chat server 20. The reception processing unit outputs a message received from the chat server 20 to the touch panel display as a comment of the user of another user terminal. Each user terminal 10 is connected to the chat server 20 through a chat socket. By the chat socket, the information update is reflected in real time, and shared between the respective user terminals 10.

The chat destination management section 112 records information relating to a chat group to which the user terminal 10 and the user belong, and a contact destination, which is designated in the user terminal 10. The user of the user terminal 10 can transmit/receive a message between a participating user and a contact destination user of the chat group. The message storage section 113 records messages that are transmitted/received using the chat service.

The chat server 20 is a computer system that provides the chat service to the user terminals 10 and manages the chat service. The chat server 20 includes a chat management section 21 provided with a CPU, a RAM, a ROM and the like, a user management section 22, a message storage section 23, and a logic storage section 24.

The chat management section 21 serves as a message processing section, and includes a message management section 211 and a game management section 212. The message management section 211 receives a message from each user terminal 10, and records the message in the message storage section 23. The message management section 211 transmits the message to the other user terminals 10 that belong to the chat group.

In a case where a game icon is selected in one user terminal 10 belonging to the chat group, the game management section 212 extracts game logic corresponding to the game icon from the logic storage section 24. The game management section 212 transmits a message (a game message) corresponding to the extracted game logic to the other user terminals 10 belonging to the chat group. The game management section 212 holds a game management table for managing the development of the game. The game management table temporarily stores data relating to an icon ID, a chat group ID, an entry period, a user ID, an entry attribute, and an entry state. In a case where an entry responding process corresponding to the game icon has ended, the game management table is deleted.

In a data area of the icon ID, data relating to an identifier for identifying the selected game icon is recorded. In a data area of a chat group ID, data relating to the identifier for identifying the chat group to which the user terminal of the user who selects the game icon belongs is recorded. In a data area of an entry period, data relating to a period during which each user who belongs to the chat group is allowed to gain entry is recorded. In a data area of the user ID, data relating to the identifier for identifying each user who belongs to the chat group is recorded. In a data area of an entry attribute, data relating to an entry condition (for example, an order of entries and the like) of the users who belong to the chat group is recorded. In a data area of the entry state, data relating to an entry state (for example, the presence or absence of an entry, the number of times of entries, a content of entry, and the like) is recorded.

The user management section 22 manages information relating to the users of the chat service and the chat group. The message storage section 23 records the message received from each user terminal 10 in association with information on a sender and information on the chat group. The logic storage section 24 stores game logic that is used to generate output content in correspondence with the game icon. The logic storage section 24 records the game logic for generating the output content in association with the icon ID for identifying the game icon. In the game logic, a method of developing the game, sticker candidates to be output, end conditions of the game and the like are recorded. In a case where the entry period is set in the game, the logic storage section 24 records an entry allowable period in association with the icon ID.

In a case where a user terminal 10 belonging to the chat group is in offline, the chat server 20 transmits a push notification to the user terminal 10. The user terminal 10 can be urged to activate the chat application by the push notification.

Next, the outline of a processing flow in the chat server 20 will be described with reference to FIG. 2. In the depicted example, it is assumed that users A, B, and C who belong to the same chat group play a coin toss game. First, the chat management section 21 of the chat server 20 performs a message reception process (Step S1-1). Specifically, the message management section 211 receives a message from the user terminal 10. In the message, the chat group ID, the user ID, a text, or the icon ID, which identifies the selected icon (sticker), is included.

Next, the chat management section 21 performs a determination process on whether the game icon has been selected in the user terminal 10 (Step S1-2). Specifically, the message management section 211 determines the type of the message received from the user terminal 10. In a case where the message includes the icon ID recorded in the logic storage section 24, that is, a case where the icon ID is received from the user terminal 10, the message management section 211 determines that the type of the message is selection of the game icon.

In a case where it is determined that the type of the message is not the selection of the game icon ("NO" in Step S1-2), the chat management section 21 performs a message registration process (Step S1-3). Specifically, the message management section 211 records the message received from the user terminal 10 in the message storage section 23 in association with the chat group ID and the user ID of the sender.

Next, the chat management section 21 performs a message display process (Step S1-4). Specifically, the message management section 211 displays the message on the timeline view, which is output to the touch panel display of the other user terminals 10 belonging to the chat group of the chat group ID.

Figure 3:
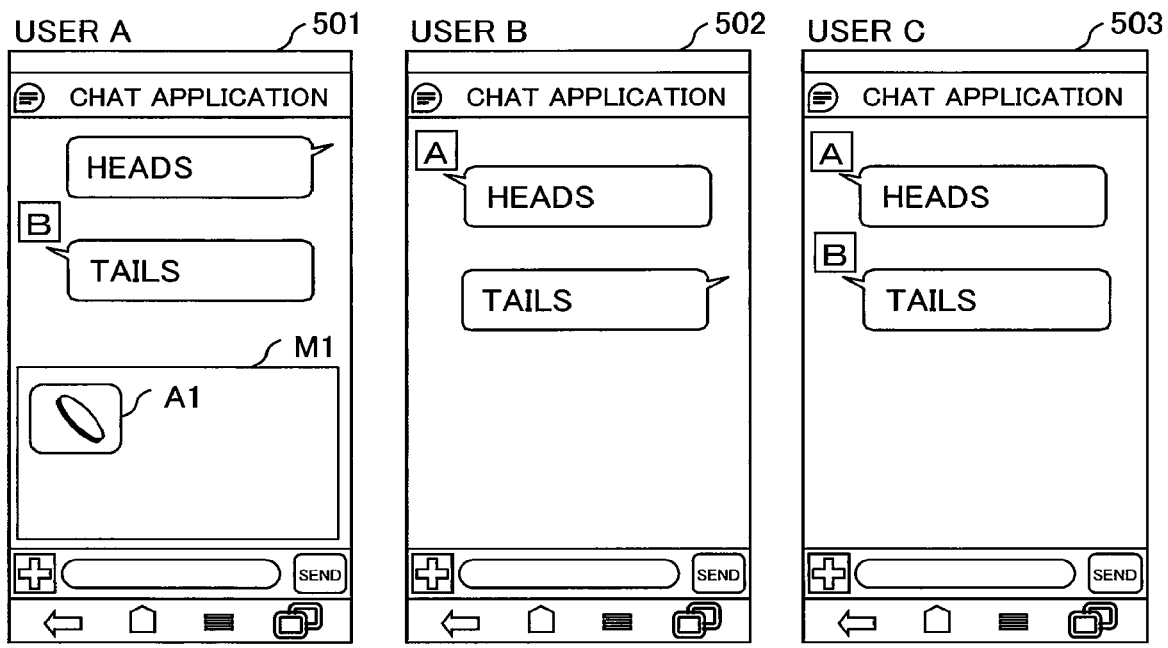
FIG. 3 is a diagram for describing exemplary views in the procedure of FIG. 2.
Figure 3:
Figure 3:
Figure 3:
Figure 3:
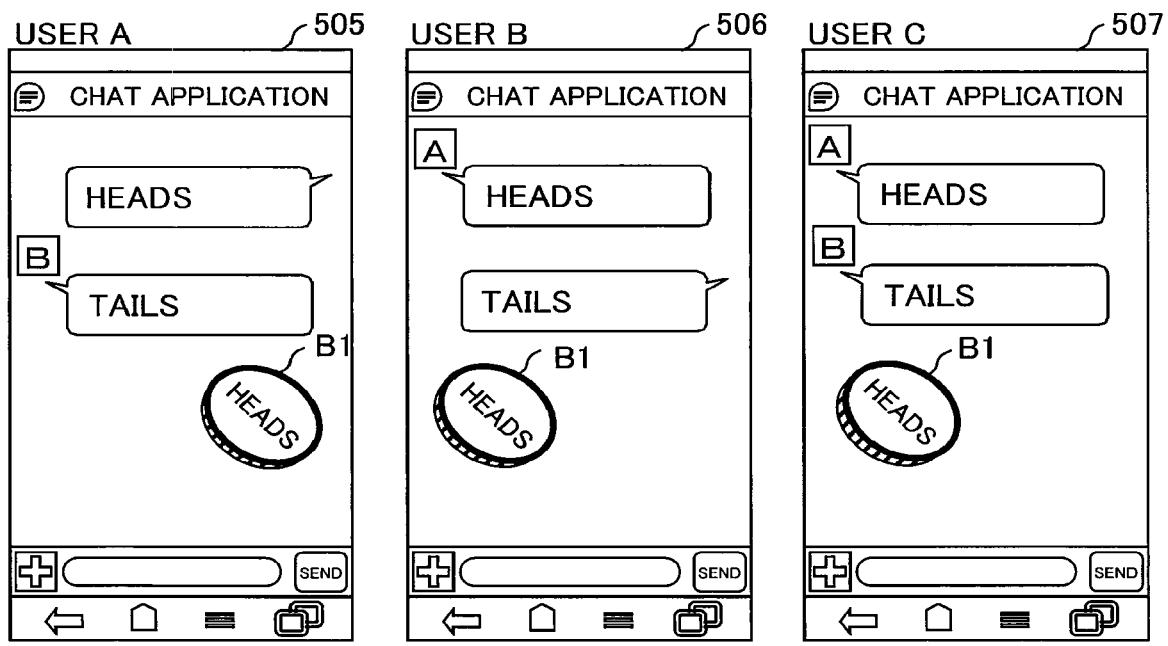

As illustrated in FIG. 3, a case where the user A proposes the coin toss game will be discussed. In this case, each user transmits a message expressing each user's own prediction. For example, the user A transmits a message of "Heads", and the user B transmits a message of "Tails". It is assumed that the user C does not participate in the game and thus not give a prediction. In this case, views 501, 502, and 503 are output in the touch panel displays of the user terminals 10 of the users A to C, respectively.

In the touch panel display of the user terminal 10 of the user A, an icon menu M1 for using the game icon is output. In the icon menu M1, various icons available in the chat are included. The user A selects a game icon A1 of "Coin Toss" among these icons.

In a case where it is determined that the game icon has been selected ("YES" in Step S1-2), the chat management section 21 performs a random selection process (Step S1-5). Specifically, the message management section 211 leaves the process to the game management section 212. In this case, the game management section 212 acquires a game logic associated with the icon ID of the selected game icon from the logic storage section 24. The game management section 212 determines a sticker to be displayed based on the acquired game logic. In this case, the sticker (the game message) determined by the game management section 212 is recorded in the message storage section 23 in association with the chat group ID and the user ID of the sender.

Next, the chat management section 21 performs a result display process (Step S1-6). Specifically, the game management section 212 displays the game message recorded in the message storage section 23 on the timeline view of the other user terminals 10 belonging to the chat group.

In a case where the game in progress is of "Coin Toss", the game management section 212 randomly selects one of two sticker candidates, that is, "Heads" and "Tails". In detail, the game management section 212 generates a random value based on the game logic recorded in the logic storage section 24, and selects one of "Heads" and "Tails" according to the random value. Herein, it is assumed that "Heads" has been selected.

In this case, as illustrated in FIG. 3, views 505, 506, and 507 are output to the touch panel displays of the user terminals 10 of the users A to C, respectively. In each of the views 505, 506, and 507, a randomly selected sticker B1 (herein, the sticker showing "Heads") is output as the game message.

According to the first embodiment, the following advantages may be achieved:

(1) The chat management section 21 serves as a message processing section, and includes the message management section 211 and the game management section 212. In a case where it is detected that the game icon has been selected in one user terminal 10, the game management section 212 extracts the game logic corresponding to the game icon from the logic storage section 24. The game management section 212 transmits a message according to the extracted game logic to the other user terminals 10 belonging to the chat group. Therefore, it makes it possible for users to communicate using expressive messages such as input texts or designated icons of the users. It is possible to smoothly communicate using various messages generated according to the game logic. For example, stickers having game elements and unexpected messages are output, and thus a variety of communications is achieved.

(2) The game management section 212 generates the random value based on the game logic recorded in the logic storage section 24, and selects the sticker according to the random value. Therefore, it is possible to communicate using messages that are randomly changed. Since the stickers are selected by a fortuity element, it is possible to play the game using the elements or to offer a topic of the communication.

In addition, the first embodiment may be modified. For example, in the first embodiment as described above, three users play a coin toss game in association with two sticker candidates, but the number of users and the number of sticker candidates are not limited thereto.

A second embodiment will now be described with reference to FIGS. 4 to 6. The second embodiment is different from the first embodiment in that the game logic is changed. For brevity, the details of the same portions as those of the first embodiment will not be repeated. Herein, the outline of an entry processing flow will be described. Specifically, it is assumed that the users A, B, and C who belong to the same chat group participate in a game and determine the order using dice.

Figure 4:
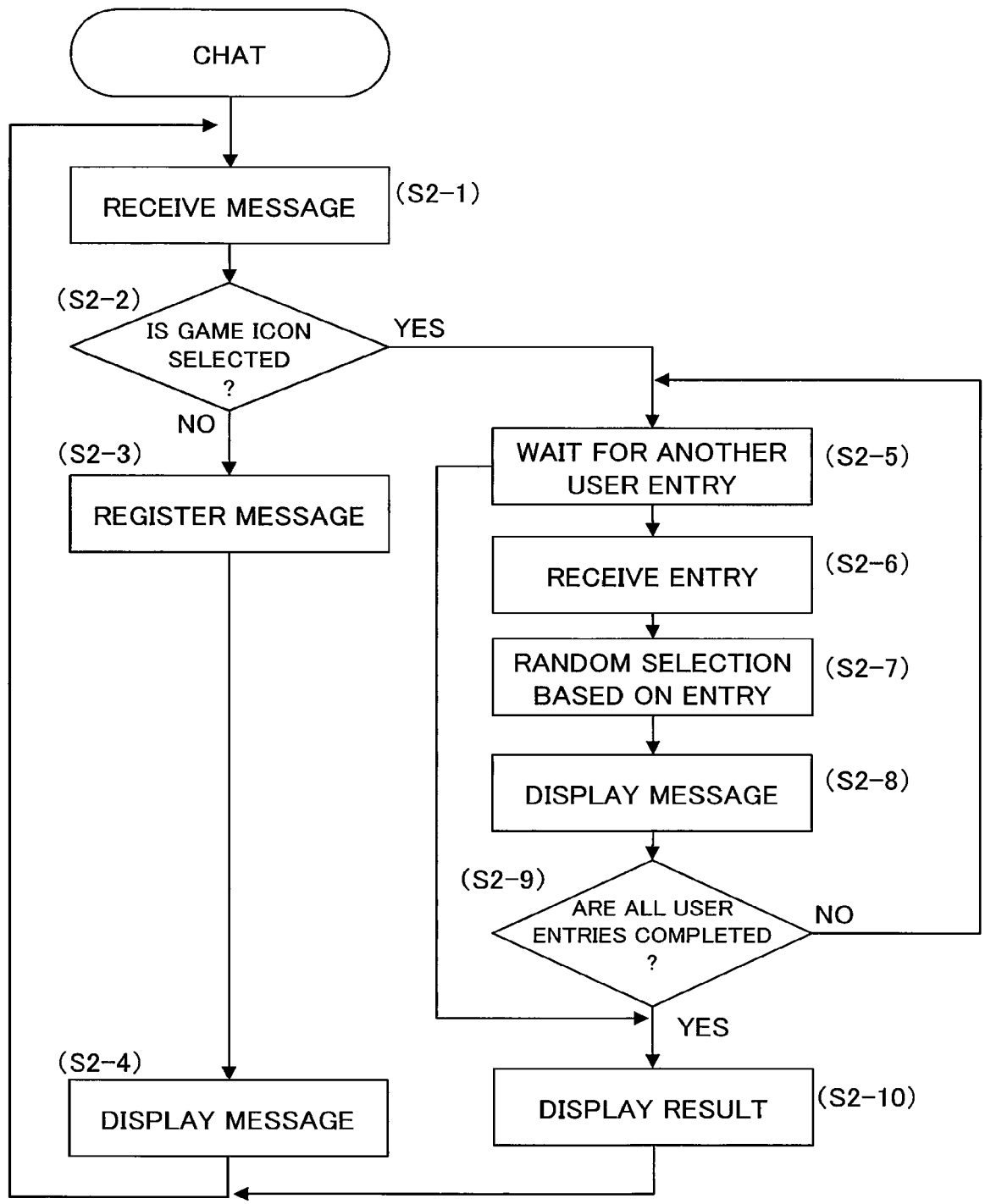
FIG. 4 is a diagram for describing a procedure of the system of FIG. 1 according to a second embodiment.

As illustrated in FIG. 4, first, the chat management section 21 performs the message reception process similarly to Step S1-1 (Step S2-1). Next, similarly to Step S1-2, the chat management section 21 performs the determination process on whether the game icon has been selected (Step S2-2). Herein, similarly to Step S1-3, in a case where it is determined that the type of the message is not the selection of the game icon ("NO" in Step S2-2), the chat management section 21 performs a message registration process (Step S2-3). Next, similarly to Step S1-4, the chat management section 21 performs the message display process (Step S2-4). The chat management section 21 returns to the message reception process (Step S2-1).

Figure 5:
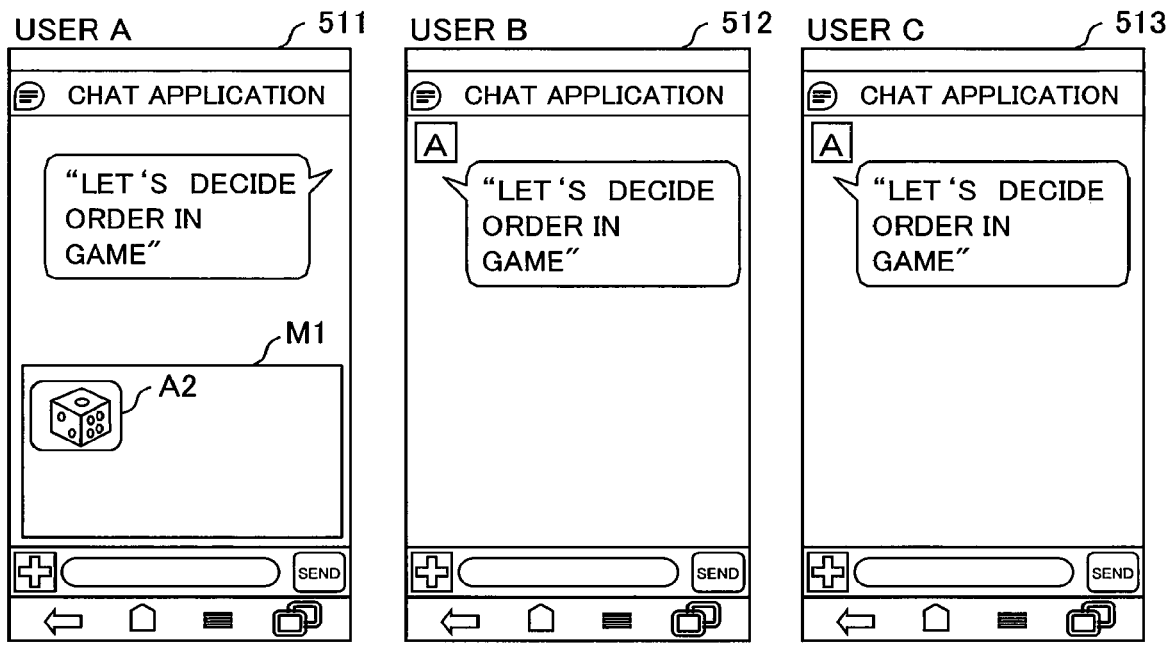
FIG. 5 is a diagram for describing exemplary views in the procedure of FIG. 4.
Figure 5:
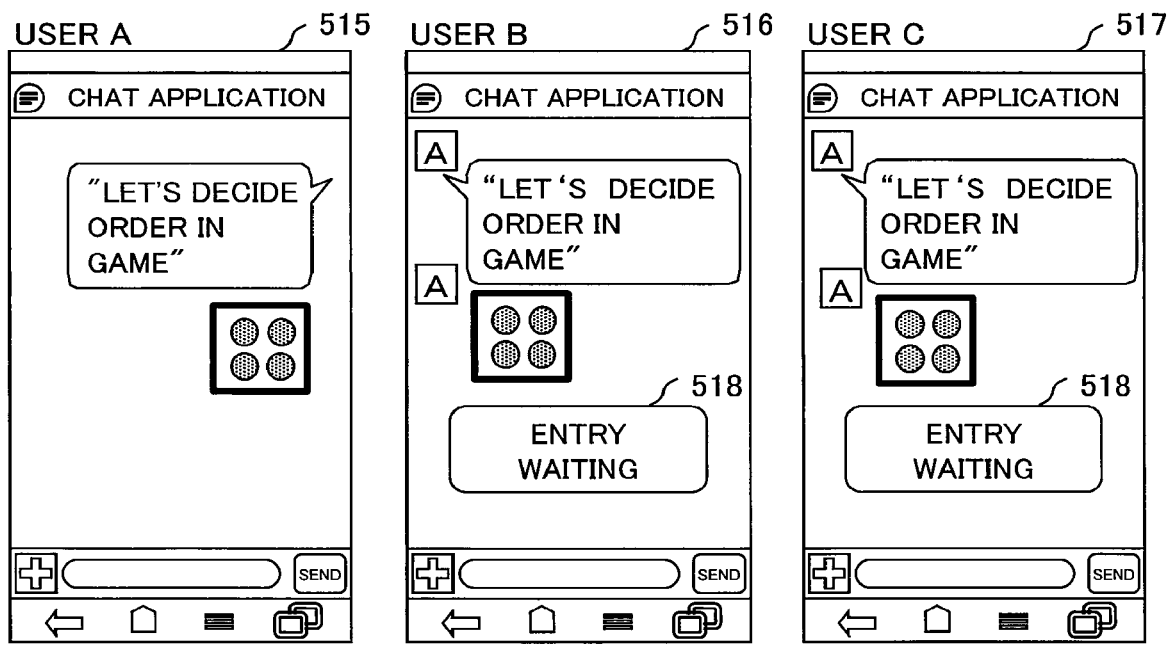

Herein, as illustrated in FIG. 5, it is assumed that the user A proposes a dice game. In this case, views 511, 512, and 513 are output in the touch panel displays of the user terminals 10 of the users A to C, respectively. In the touch panel display of the user terminal 10 of the user A, an icon menu M1 for using the game icon is output. The user A selects a game icon A2 of "Dice."

In a case where it is determined that the game icon has been selected ("YES" in Step S2-2), the chat management section 21 performs the entry correspondence process. Herein, first, the chat management section 21 performs an entry waiting process for another user (Step S2-5). Specifically, the game management section 212 acquires the user ID of a user who belongs to the chat group in chatting from the user management section 22. Next, in a case where the entry allowable period associated with the selected icon ID is recorded in the logic storage section 24, the game management section 212 adds a time corresponding to the entry allowable period to a time at which the game icon is selected, thereby calculating an entry period corresponding to the time at which the entry acceptance ends. Next, the game management section 212 generates and stores a game management table. The entry period is recorded in the game management table in association with the icon ID and the chat group ID. The game management section 212 waits for entries from other user terminals 10 belonging to the chat group. In addition, in a case where the entry allowable period is not limited, such as a case where the entry allowable period is not recorded in the logic storage section 24, the game management section 212 sets the entry period in the game management table to a blank.

Herein, as illustrated in FIG. 5, views 515, 516, and 517 are output in the touch panel displays of the user terminals 10 of the users A to C, respectively. In this case, a message 518 of "Waiting for entry" is displayed on the touch panel displays of the user terminals 10 of the users B and C before the entry.

Next, the chat management section 21 performs an entry reception process (Step S2-6). Specifically, in a case where an entry is performed in the user terminal 10 of another user who belongs to the chat group, the user terminal 10 transmits an entry message to the chat server 20. The entry message includes information relating to the sender's user ID, the chat group ID, and the icon ID. When receiving an entry from the user terminal 10 of another user who belongs to the chat group, the game management section 212 records an entry state in the game management table in association with the sender's user ID and the chat group ID.

Next, the chat management section 21 performs the random selection process on the received entry (Step S2-7). Specifically, the game management section 212 determines a sticker to be displayed among the sticker candidates according to the game logic registered in the logic storage section 24 based on the entry state recorded in the game management table. Herein, the game management section 212 generates a random value, and selects a sticker according to the random value. The game management section 212 records the selected sticker in a data area of the entry state of the game management table in association with the user ID.

The chat management section 21 performs the message display process (Step S2-8). Specifically, the game management section 212 registers the selected sticker in the message storage section 23 as a game message. The game management section 212 outputs the selected sticker in the touch panel display of each user terminal 10.

Next, the chat management section 21 performs the determination process on whether all the users have completed the entries (Step S2-9). Specifically, the game management section 212 determines whether the entries have been received from all the users who belong to the chat group with reference to the game management table. In a case where it is determined that any one of the users has not completed the entry ("NO" in Step S2-9), the chat management section 21 returns to the entry waiting process (Step S2-5).

In addition, in a case where the entry period is recorded in the game management table, the chat management section 21 monitors the end of the entry period capable of allowing the entry acceptance, in the entry waiting process (Step S2-5). Specifically, the game management section 212 acquires the current time, and compares the current time with the entry period in the game management table. In a case where the current time exceeds the entry period, it is determined that the entry period has ended. In this case, the chat management section 21 skips the processes of Steps S2-6 to S2-9.

In a case where it is determined that the entry period has ended (Step S2-5) or all the users have completed the entries ("YES" in Step S2-9), the chat management section 21 performs the result display process (Step S2-10). Specifically, the game management section 212 displays a sticker as a result of a random selection corresponding to each entry. The chat management section 21 ends the entry responding process.

Figure 6:
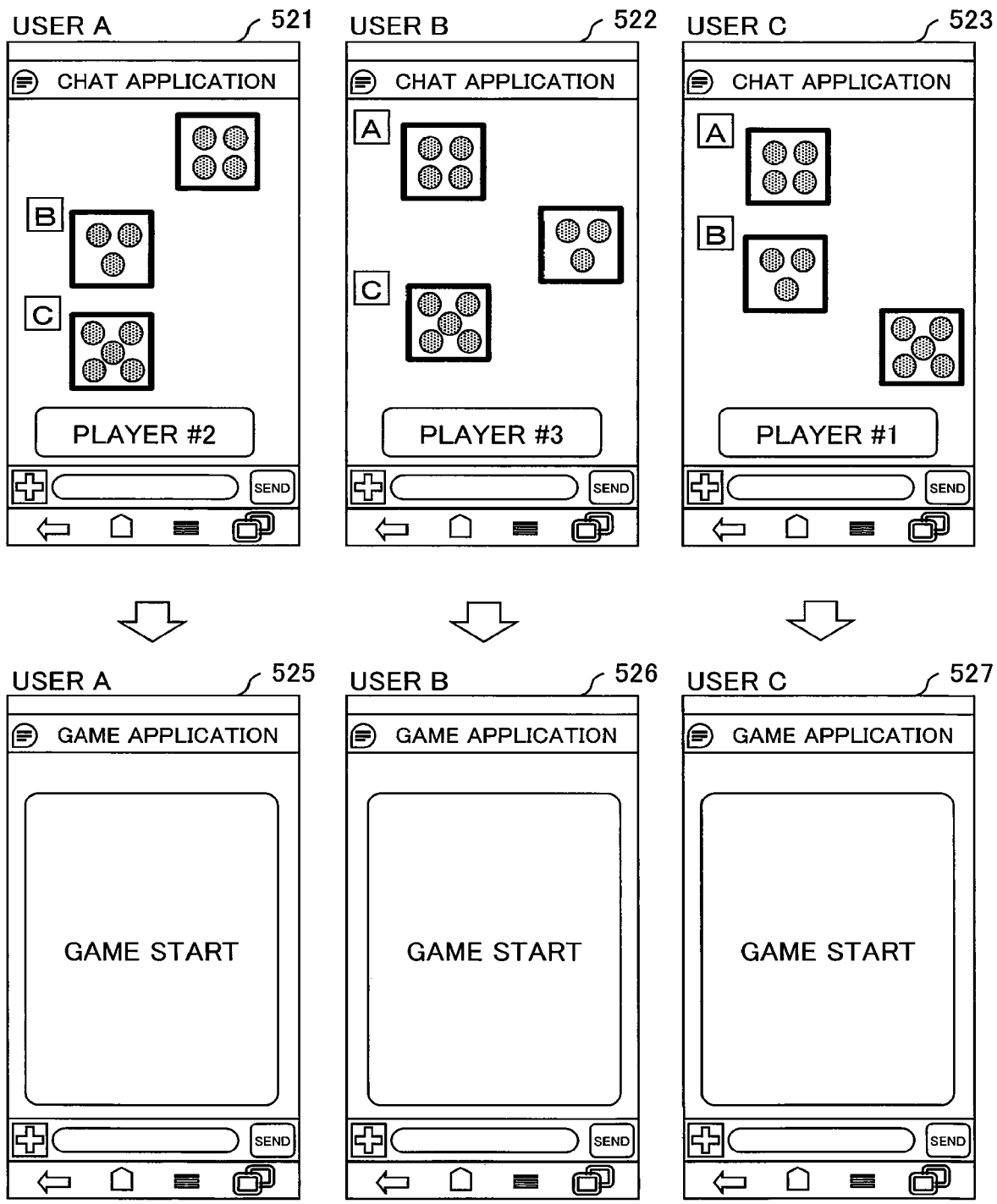
FIG. 6 is a diagram for describing exemplary views in the procedure of FIG. 4.

Herein, as illustrated in FIG. 6, views 521, 522, 523 are output in the touch panel displays of the user terminals 10 of the users A to C, respectively. In this case, the ranks are determined according to the magnitude of the number displayed on the dice. The user terminals 10 of the users A to C start to play the game as illustrated in views 525, 526, and 527 in the order according to the determined ranks.

According to the second embodiment, the following advantages are achieved in addition to the above advantages (1) and (2).

(3) The chat management section 21 performs the entry waiting process (Step S2-5) and the entry reception process (Step S2-6). The chat management section 21 performs the random selection process on the received entry (Step S2-7). Therefore, it is possible to make communication according to the entry states (for example, the order of entries) of the user terminals belonging to the chat group. A message that contains a game element can be output according to the entry states of the users belonging to the chat group. For example, when the users shift from the chat application to another application such as a full-fledged game, the order of players is determined in the chat communication, so that the game can be played using the order.

(4) In a case where the entry period is recorded in the game management table, the chat management section 21 monitors the end of the entry period in the entry waiting process (Step S2-5). Therefore, it is possible to end the entry responding process under a predetermined condition. For example, it is possible to recruit users hoping to participate in the game during a predetermined period.

(5) The chat management section 21 performs the random selection process on the received entry (Step S2-7), and performs the message display process (Step S2-8).

Therefore, each user can confirm the result according to its own entry at once. In addition, the second embodiment may be modified. For example, in the second embodiment as described above, three users play the dice game, but the number of users and the shape of the sticker are not limited thereto. Further, the chat management section 21 performs the random selection process on the received entry (Step S2-7). Herein, the chat management section 21 may select the sticker candidates based on the timing of the entry. For example, in a case where the game icon is selected, consecutive numerical values are automatically generated, and a numerical value generated at the timing of the entry may be used. Moreover, in the second embodiment, the entry period is set based on the game logic, which is recorded in the logic storage section 24. The method of setting the entry period is not limited to the above method. For example, the user (herein, the user A), who proposes the game, may set a desired time as the entry period. In this case, when the game icon is selected in the user terminal 10 of the user A, the chat management section 21 urges the user terminal 10 to input the entry allowable period, and the entry period is set using the input entry allowable period.

Next, a third embodiment will be described with reference to FIGS. 7 to 9. The third embodiment is different from the first and second embodiments only in that the game logic is changed. For purposes of brevity, the details of the same portions as those of the first and second embodiments will not repeated. Herein, the outline of an entry processing flow will be described. Specifically, it is assumed that the users A, B, and C who belong to the same chat group play a rock-paper-scissors game.

Figure 7:
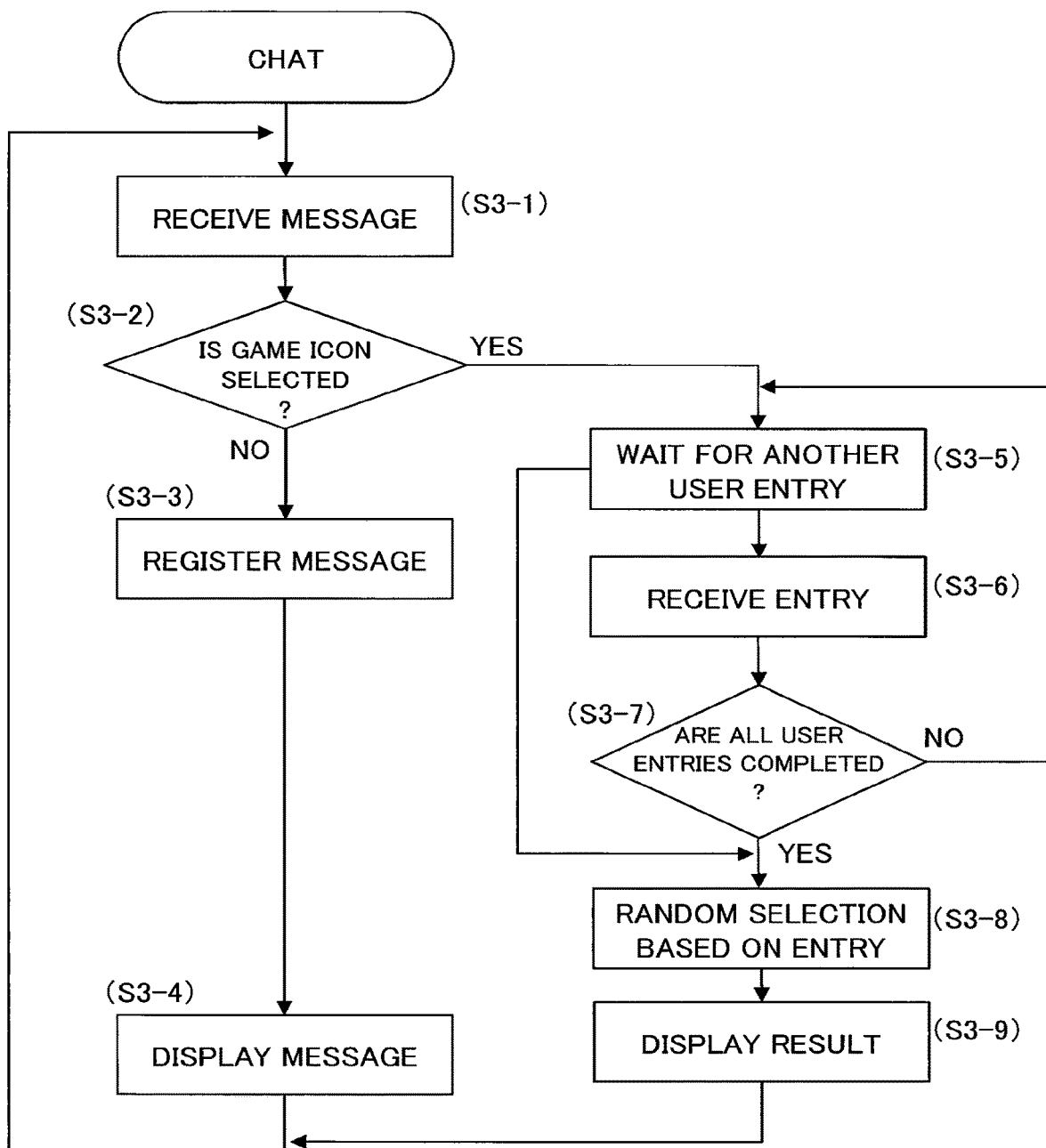
FIG. 7 is a diagram for describing a procedure of the system of FIG. 1 according to a third embodiment.

As illustrated in FIG. 7, first, the chat management section 21 performs the message reception process similarly to Step S1-1 (Step S3-1). Next, similarly to Step S1-2, the chat management section 21 performs the determination process on whether the game icon has been selected (Step S3-2). Herein, similarly to Step S1-3, in a case where it is determined that the type of the message is not the selection of the game icon ("NO" in Step S3-2), the chat management section 21 performs a message registration process (Step S3-3). Next, similarly to Step S1-4, the chat management section 21 performs the message display process (Step S3-4). The chat management section 21 returns to the message reception process (Step S3-1).

Figure 8:
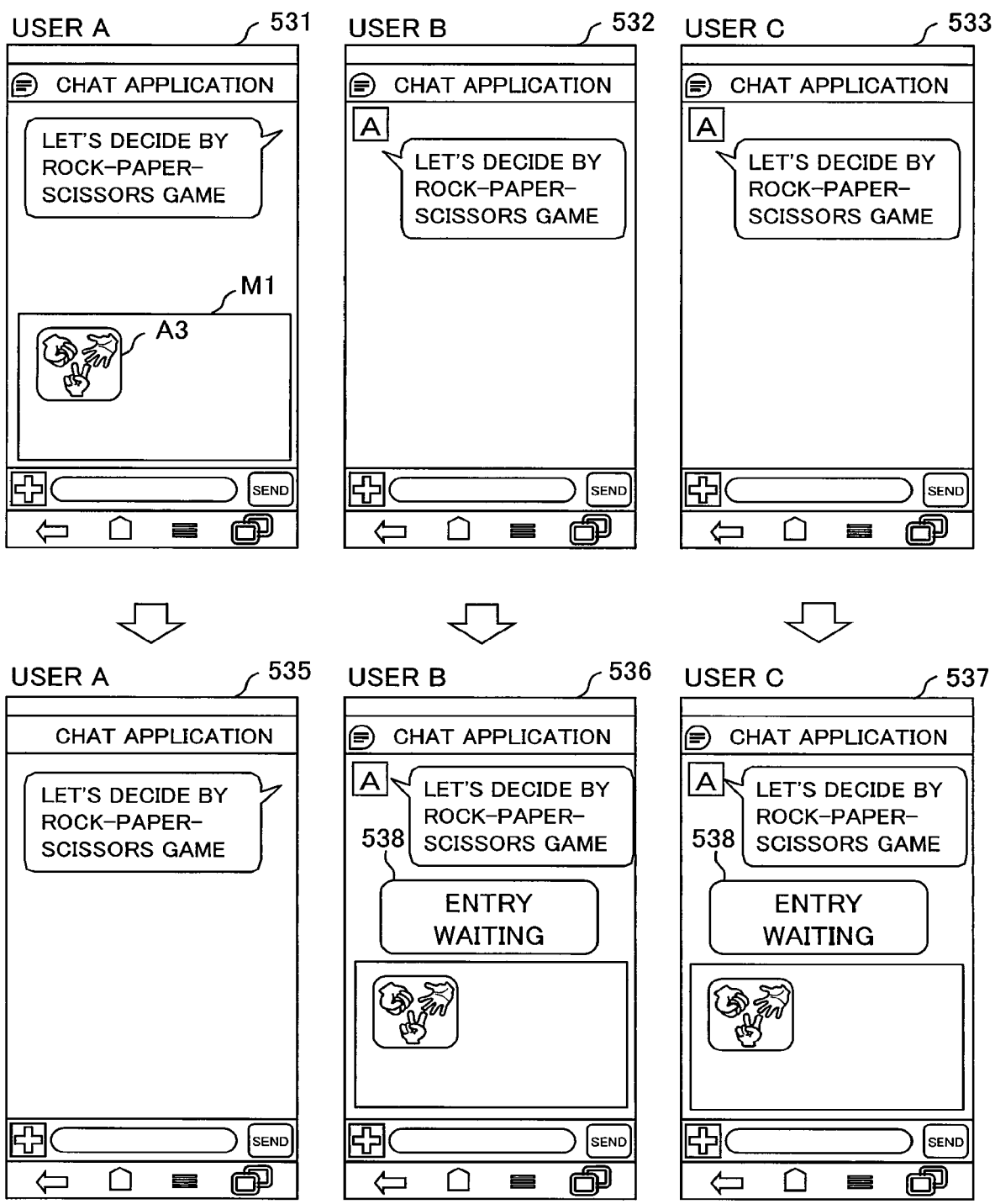
FIG. 8 is a diagram for describing exemplary views in the procedure of FIG. 7.

Herein, as illustrated in FIG. 8, it is assumed that the user A proposes the rock-paper-scissors game. In this case, views 531, 532, and 533 are output in the touch panel displays of the user terminals 10 of the users A to C, respectively.

In the touch panel display of the user terminal 10 of the user A, an icon menu M1 for using the game icon is output. The user A selects a game icon A3 of "rock-paper-scissors game." In a case where it is determined that the game icon has been selected ("YES" in Step S3-2), the chat management section 21 performs the entry responding process. Herein, similarly to Step S2-5, the chat management section 21 performs an entry waiting process for other users (Step S3-5).

Herein, as illustrated in FIG. 8, views 535, 536, and 537 are output in the touch panel displays of the user terminals 10 of the users A to C, respectively. In this case, a message 538 of "Waiting for entry" is displayed on the touch panel displays of the user terminals 10 of the users B and C before the entry. Next, similarly to Step S2-6, the chat management section 21 performs the entry reception process (Step S3-6).

Figure 9:
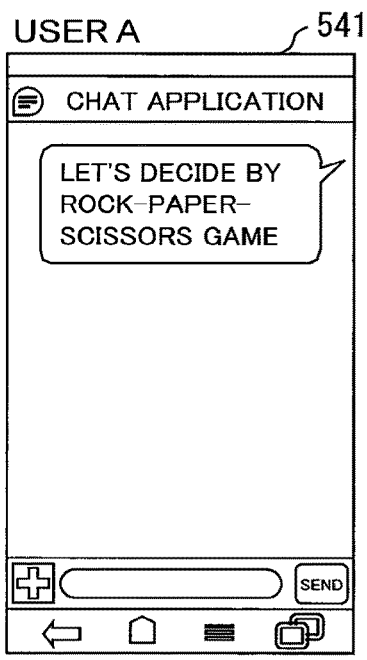
FIG. 9 is a diagram for describing exemplary views in the procedure of FIG. 7.
Figure 9:
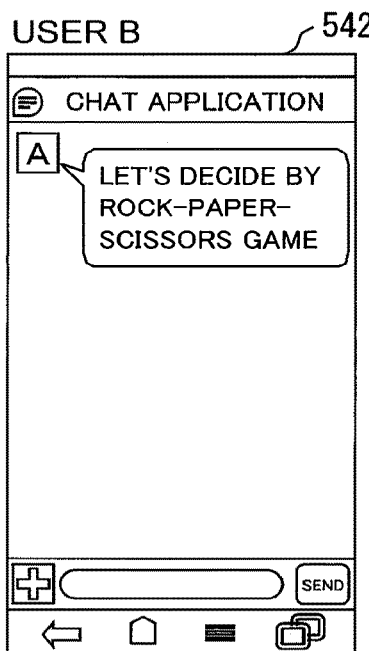
Figure 9:
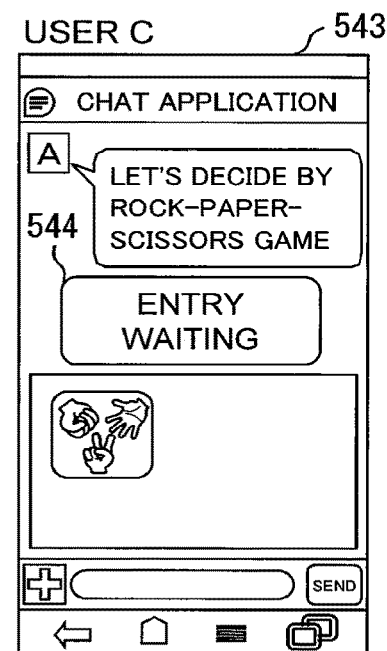
Figure 9:
Figure 9:
Figure 9:
Figure 9:
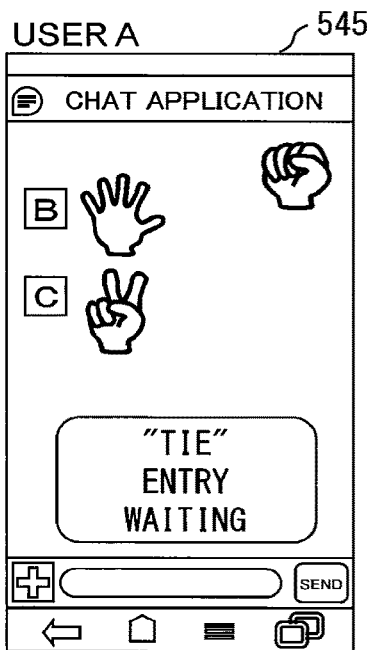
Figure 9:
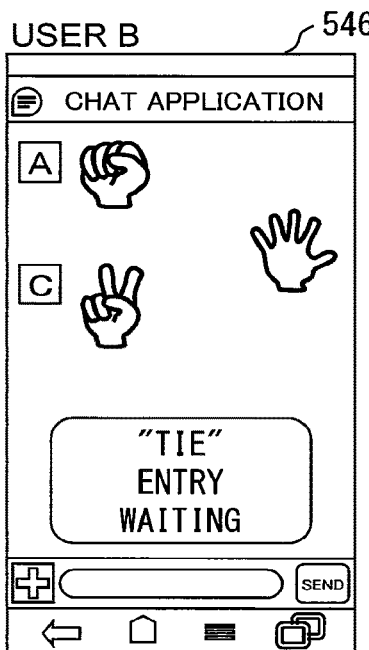
Figure 9:
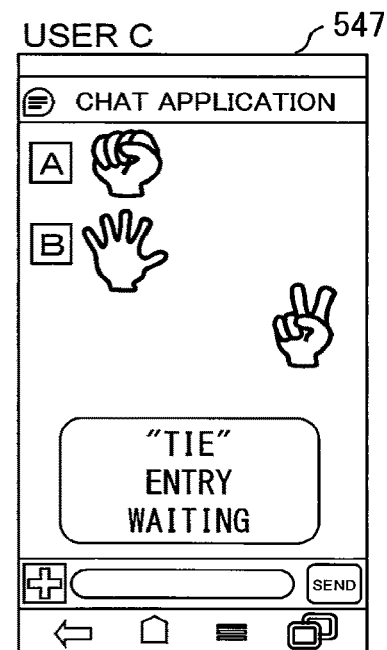

As illustrated in FIG. 9, in a case where the entry is performed in the user terminal 10 of the user B, views 541, 542, and 543 are output in the touch panel displays of the user terminals 10 of the users A to C, respectively. Herein, a message 544 of "Waiting for entry" is displayed only on the touch panel display of the user terminal 10 of the user C before the entry.

Next, similarly to Step S2-9, the chat management section 21 performs the determination process on whether all the users have completed the entries (Step S3-7). In a case where it is determined that any one of the users has not completed the entry ("NO" in Step S3-7), the chat management section 21 returns to the entry waiting process (Step S3-5). In addition, similarly to Step S2-5, in a case where the entry period is recorded in the game management table, the chat management section 21 monitors the end of the entry period in the entry waiting process (Step S3-5). In a case where it is determined that the entry period has ended (Step S3-5) or all the users have completed the entries ("YES" in Step S3-7), the chat management section 21 performs the random selection process on each received entry (Step S3-8). Specifically, the game management section 212 determines a sticker among sticker candidates according to the entry state recorded in the game management table based on the game logic recorded in the logic storage section 24. Herein, the game management section 212 generates a random value, and selects a sticker according to the random value.

Next, similarly to Step S2-10, the chat management section 21 performs the result display process (Step S3-9). Herein, as illustrated in FIG. 9, views 545, 546, and 547 are output in the touch panel displays of the user terminals 10 of the users A to C, respectively. In this case, the win-loss outcome is determined by a result of the rock-paper-scissors game.

According to the third embodiment, the following advantages are achieved in addition to the above advantages (1) to (4):

(6) In a case where it is determined that the entry period has ended (Step S3-5) or all the users have completed the entries ("YES" in Step S3-7), the chat management section 21 performs the random selection process on each received entry (Step S3-8). Therefore, the respective users can confirm the result according to the entry at the same time.

Figure 10:
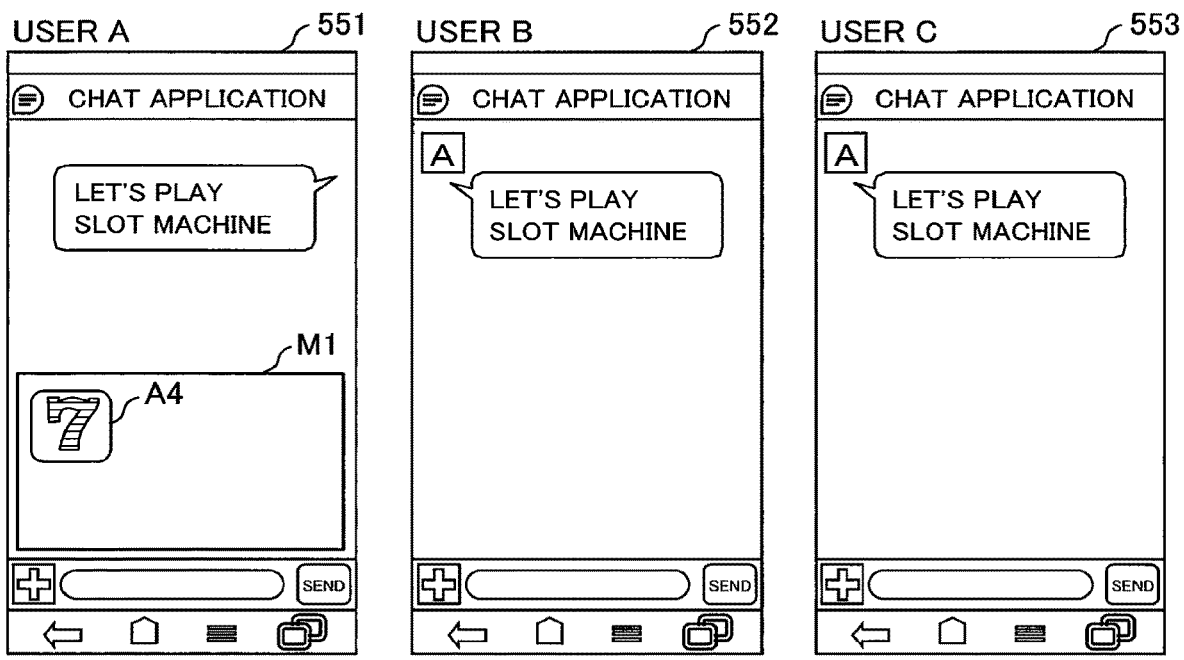
FIG. 10 is a diagram for describing exemplary views according to another embodiment.
Figure 10:
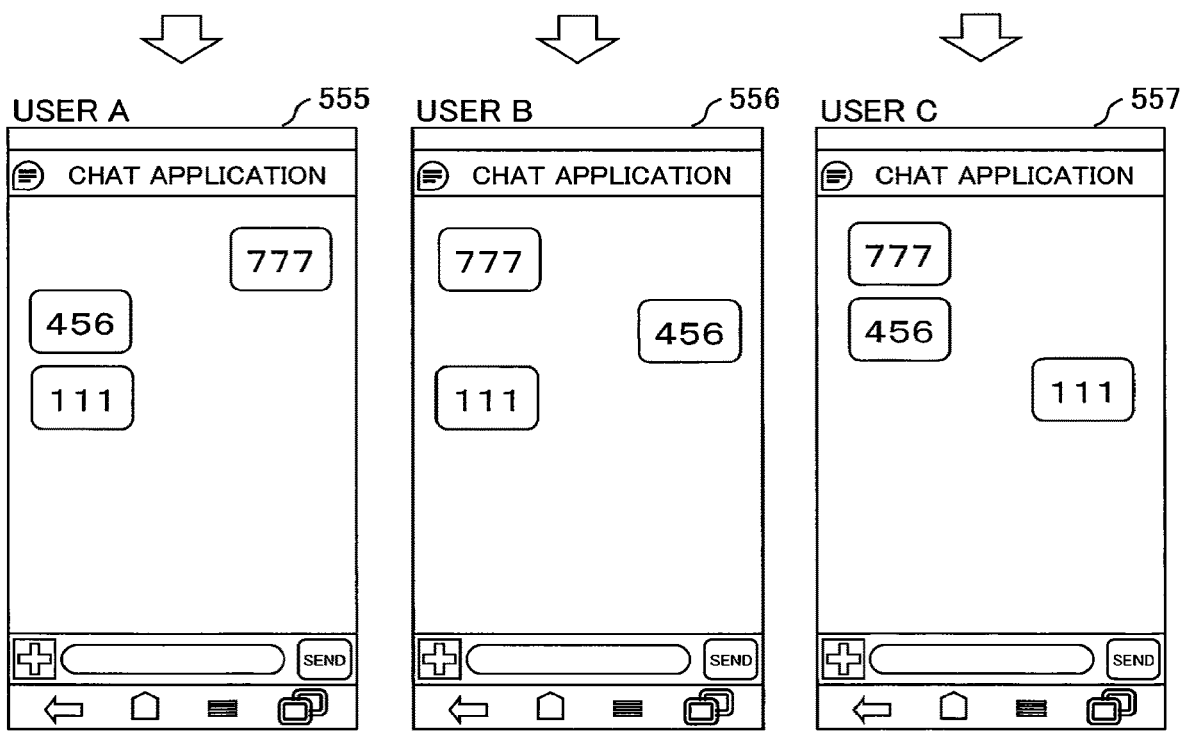

In addition, the third embodiment may be modified. The processing flow of the third embodiment can be applied to other games (for example, a slot machine game). In this case, as illustrated in FIG. 10, views 551, 552, and 553 are output in the touch panel displays of the user terminals 10 of the users A to C, respectively. The icon menu M1 is output in the touch panel display of the user terminal 10 of the user A. The user A selects a game icon A4 of "Slot machine." In a case where it is determined that the entry period has ended (Step S3-5) or all the users have completed the entries ("YES" in Step S3-7), the chat management section 21 performs the random selection process on the received entry (Step S3-8), and performs the result display process (Step S3-9). Specifically, the game management section 212 determines a sticker to be displayed among sticker candidates according to the entry state recorded in the game management table based on the game logic recorded in the logic storage section 24. Herein, the game management section 212 generates a plurality of random values, and selects a sticker according to a combination of the plurality of the random values. Views 555, 556, and 557 are output in the touch panel displays of the user terminals 10 of the users A to C, respectively.

Even in this case, the respective users can confirm the result according to the entry at the same time. Furthermore, compared to the case of the rock-paper-scissors game, since there are a lot of available combinations of the sticker candidates and various stickers can be output, it is possible to efficiently determine the win-loss outcome.

Figure 11:
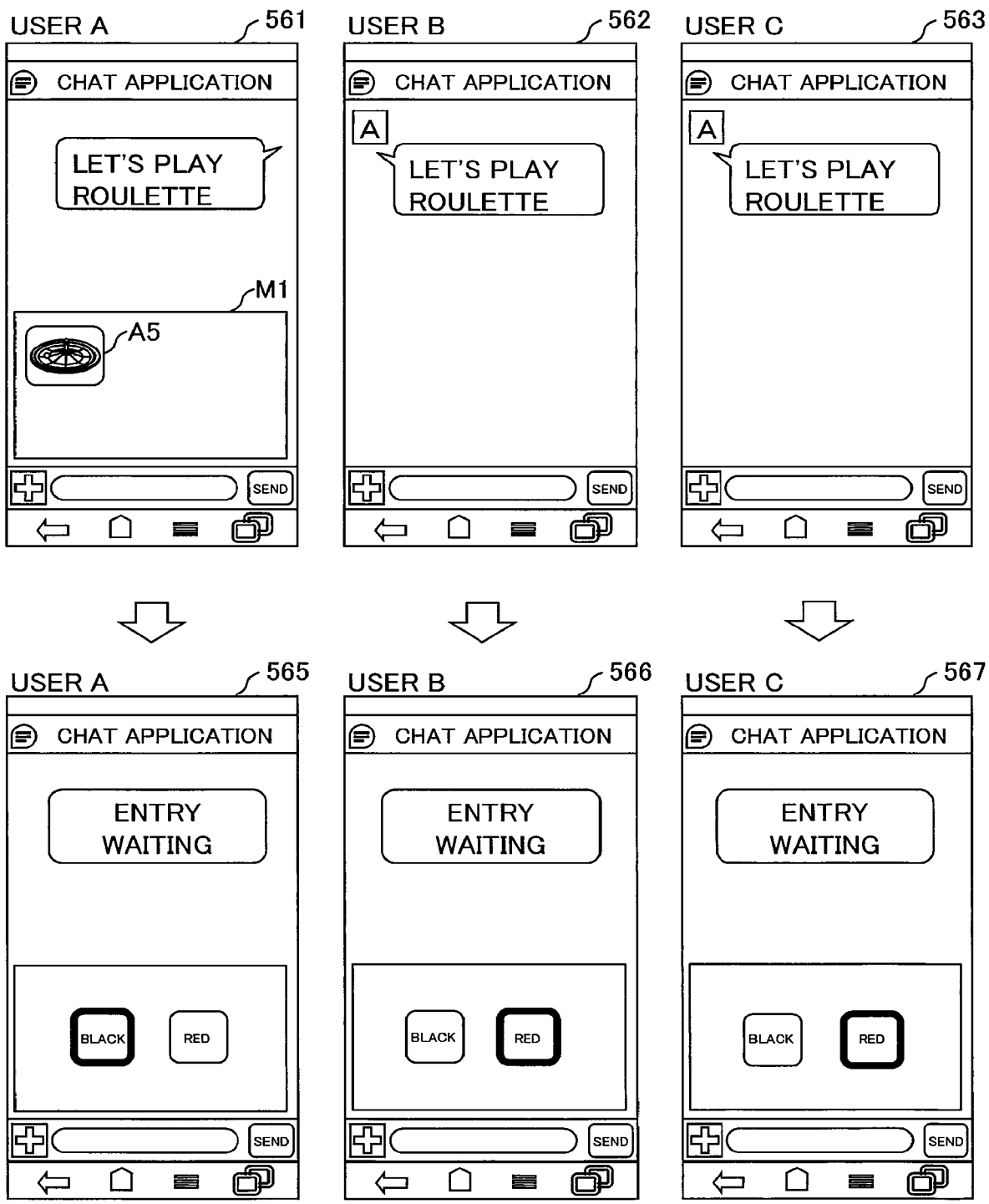
FIG. 11 is a diagram for describing exemplary views according to another embodiment.
Figure 12:
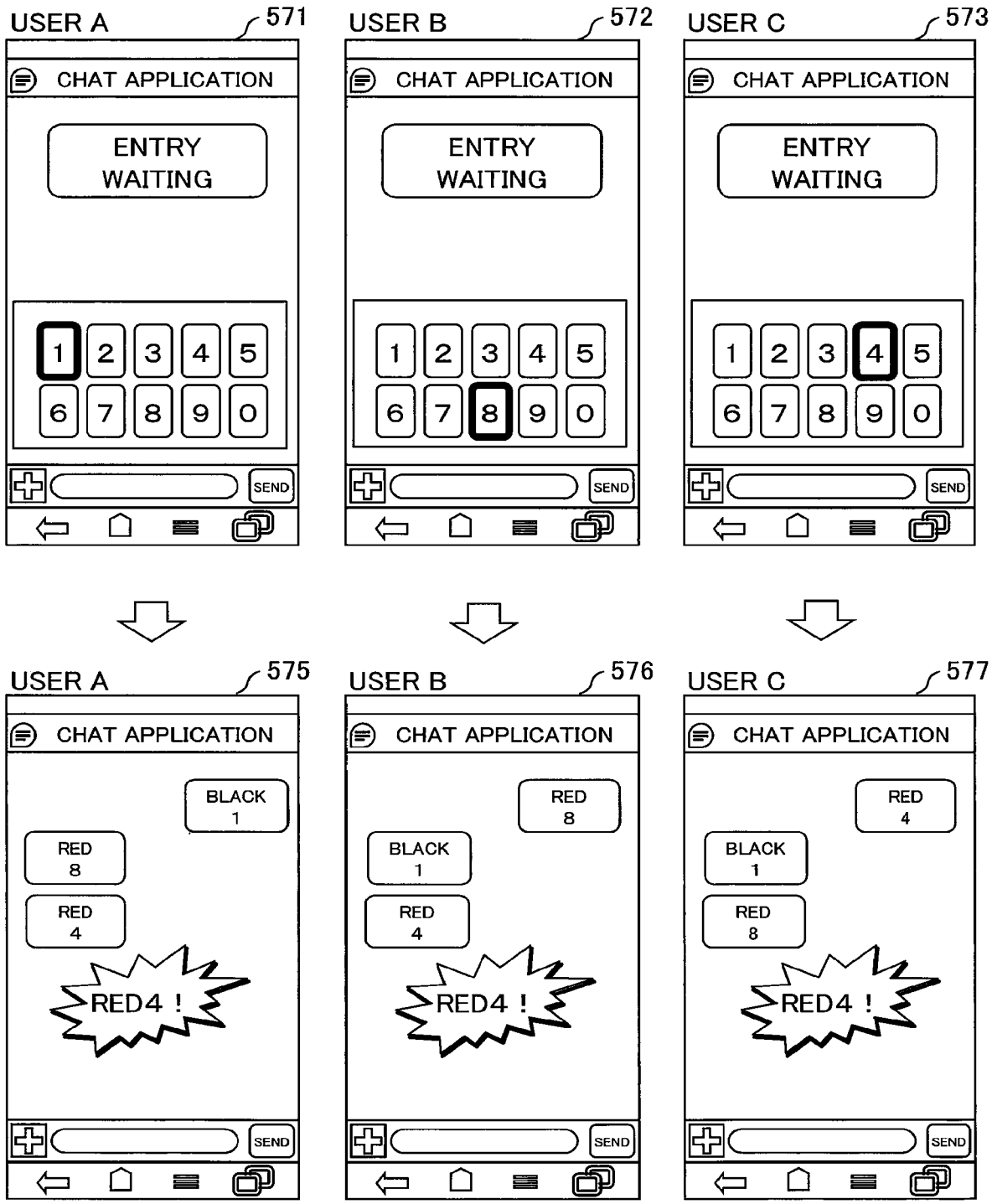
FIG. 12 is a diagram for describing exemplary views according to another embodiment.

The entry processing flow of the third embodiment can be applied to a game (for example, a roulette game) in which the user predicts a result according to its own entry and designates a predicted result. In this case, as illustrated in FIG. 11, views 561, 562, and 563 are output in the touch panel displays of the user terminals 10 of the users A to C, respectively. In the touch panel display of the user terminal 10 of the user A, an icon menu M1 is output. The user A selects a game icon A5 of "Roulette." In this case, in the entry waiting process (Step S3-5), views 565, 566, and 567 are output in the touch panel displays of the user terminals 10 of the users A to C, respectively. The user designates its own predicted result (black or red) in advance using these views. Furthermore, as illustrated in FIG. 12, views 571, 572, and 573 are output in the touch panel displays of the user terminals 10 of the users A to C, respectively. The user designates its own predicted result (number) in advance using these views. In this case, the game management section 212 records the content of entry (herein, the predicted result of color and number) input in the user terminal 10 in the data area of the entry state of the game management table.

In a case where it is determined that the entry period has ended (Step S3-5) or all the users have completed the entries ("YES" in Step S3-7), the chat management section 21 performs the random selection process on each received entry (Step S3-8), and performs the result display process (Step S3-9). In this example, the game management section 212 selects a sticker according to a combination of randomly-generated color and number from among the sticker candidates based on the game logic recorded in the logic storage section 24. Views 575, 576, and 577 are output in the touch panel displays of the user terminals 10 of the users A to C, respectively. Even in this case, the respective users can confirm the result according to the entry at the same time. Furthermore, it is possible to determine the win-loss outcome using the user's own predicted result.

Figure 13:
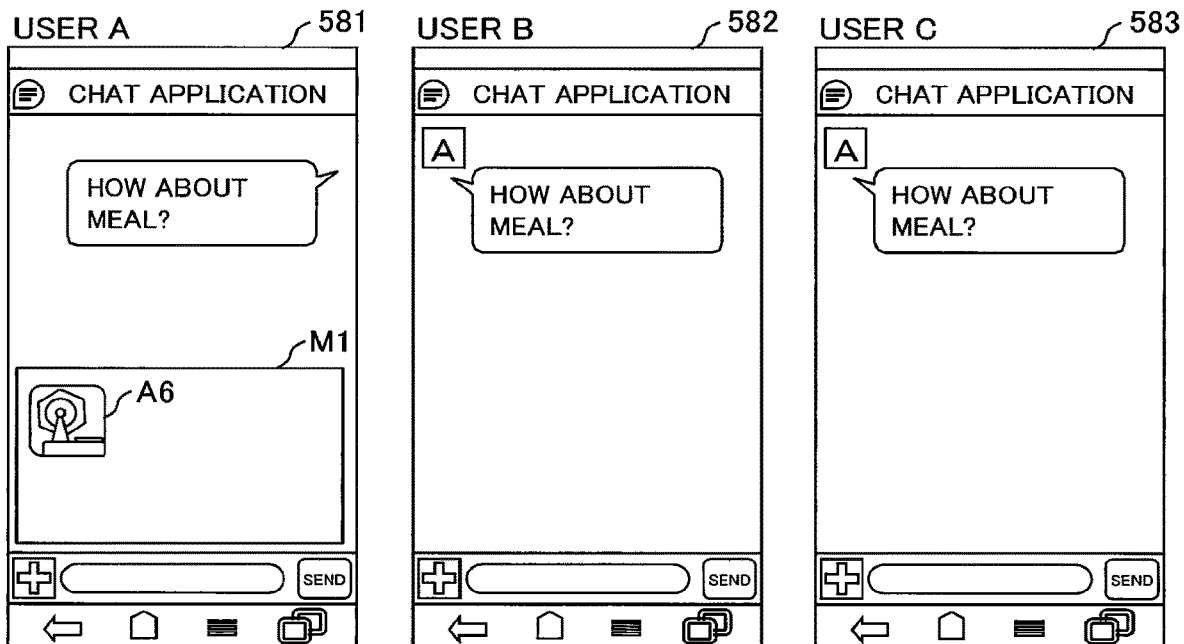
FIG. 13 is a diagram for describing exemplary views according to another embodiment.
Figure 13:
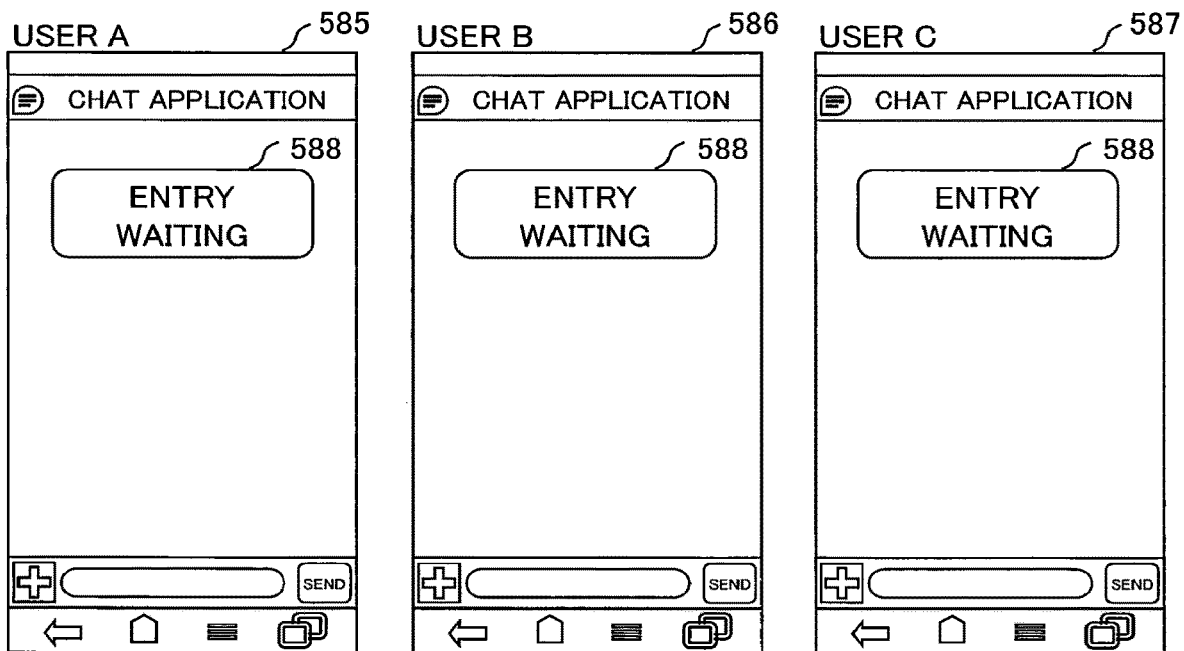

The entry processing flow of the third embodiment can also be applied to a game (for example, a lottery) in which wishes of the users are collected and one of the wishes is selected. In this case, as illustrated in FIG. 13, views 581, 582, and 583 are output in the touch panel displays of the user terminals 10 of the users A to C, respectively. The icon menu M1 is output in the touch panel display of the user terminal 10 of the user A. The user A selects a game icon A6 of "arbitrary lottery." In this case, in the entry waiting process (Step S3-5), views 585, 586, and 587 are output in the touch panel displays of the user terminals 10 of the users A to C, respectively. In this case, for the users' wishes, a message 588 of "Waiting for entry" is displayed on the touch panel displays of the user terminals 10 of the users A, B, and C before the entry. In this example, the user A who selects the game icon A6 also gains entry for their own wish.

Figure 14:
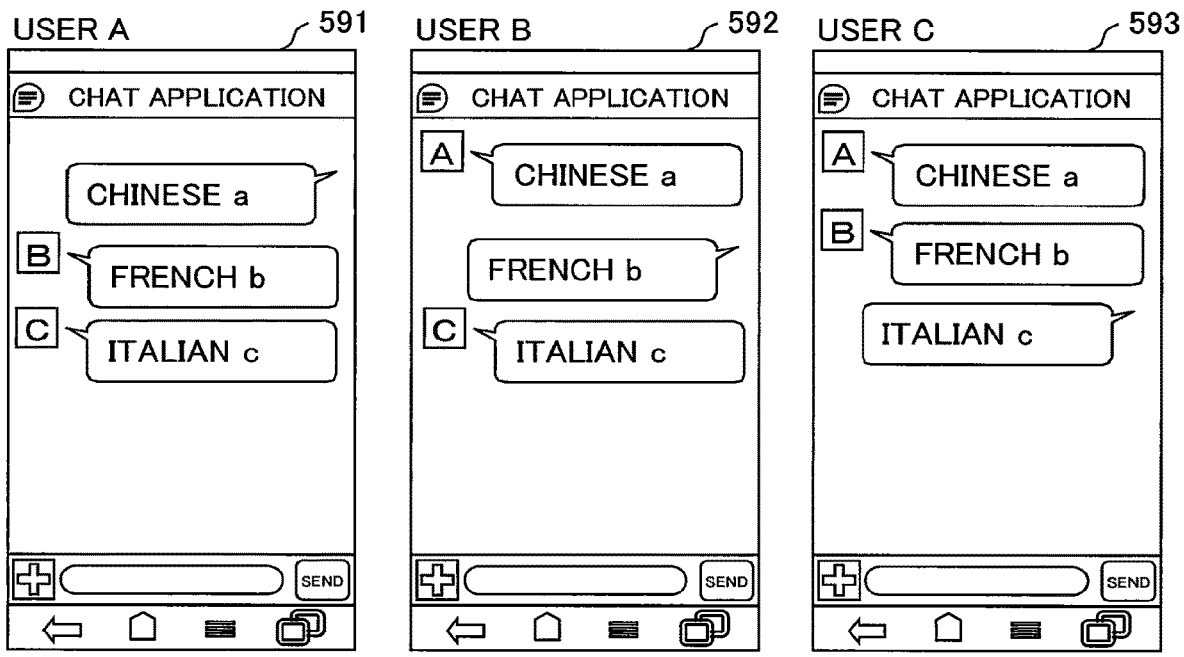
FIG. 14 is a diagram for describing exemplary views according to another embodiment.
Figure 14:
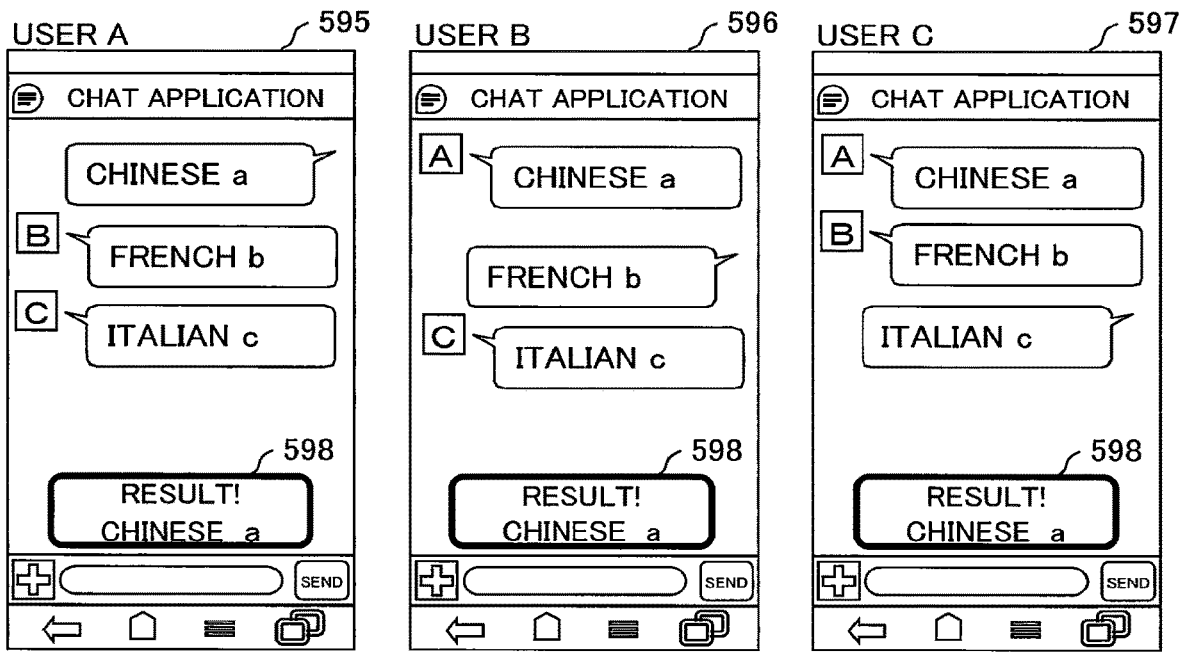

As illustrated in FIG. 14, each user inputs a wish using the user terminal 10. In this example, each user inputs a wish using a chat message such as a normal text message. In this case, the game management section 212 records the content of entries (Chinese a, French b, and Italian c) input through the chat messages in the data area of the entry state of the game management table. As a result, views 591, 592, and 593 are output in the touch panel displays of the user terminals 10 of the users A to C.

In a case where it is determined that the entry period has ended (Step S3-5) or all the users have completed the entries ("YES" in Step S3-7), the chat management section 21 performs the random selection process on each received entry (Step S3-8), and performs the result display process (Step S3-9). In this example, the game management section 212 randomly selects (that is, draws) any content of entry from the content of entries (Chinese a, French b, Italian c) recorded in the data area of the entry state of the game management table based on the game logic recorded in the logic storage section 24. In this example, it is assumed that "Chinese a" is drawn. Views 595, 596, and 597 are output in the touch panel displays of the user terminals 10 of the users A to C, respectively. In each view, a lottery result 598 is displayed.

Therefore, it is possible to narrow the plurality of candidates proposed by the users down to an arbitrary candidate. For example, even in a case where the plurality of proposed candidates is difficult to be narrowed, it is possible to perform the narrowing as if it were a game.

Of course, the number of participating users and the shape of the sticker of the third embodiment are not limited to the above described configuration.

Next, a fourth embodiment will be described with reference to FIGS. 15 to 17. The fourth embodiment is different from the first and second embodiments only in that the game logic is changed. For purposes of brevity, the details of the same portions as those of the first and second embodiments will not be repeated. In this example, the outline of a turn processing flow will be described. It is assumed that the users A and B who belong to the same chat group play a game alternately (in turn).

Figure 15:
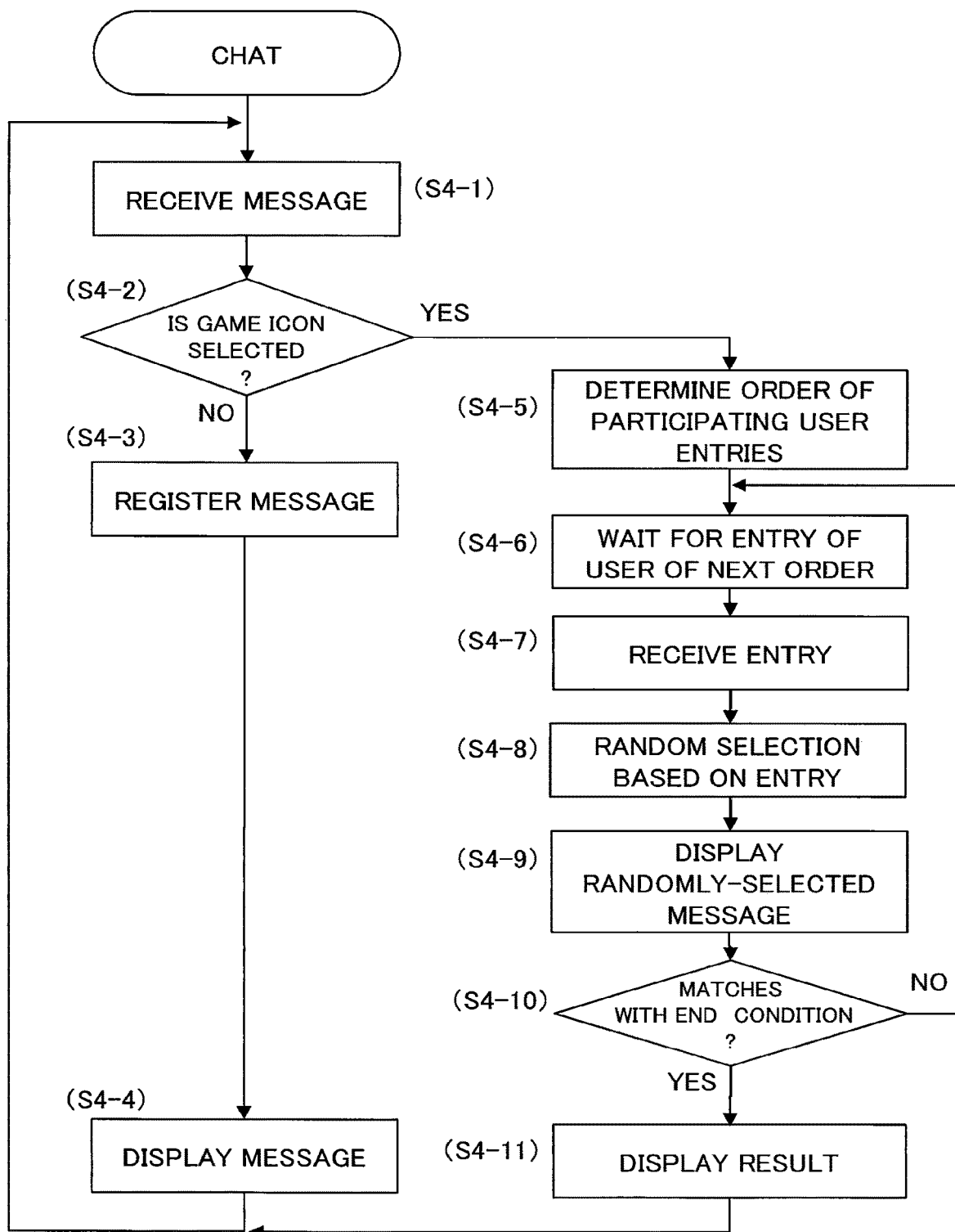
FIG. 15 is a diagram for describing a procedure of the system of FIG. 1 according to a fourth embodiment.

As illustrated in FIG. 15, first, the chat management section 21 performs the message reception process similarly to Step S1-1 (Step S4-1). Next, similarly to Step S1-2, the chat management section 21 performs the determination process on whether the game icon has been selected (Step S4-2). Similarly to Step S1-3, in a case where it is determined that the type of the message is not the selection of the game icon ("NO" in Step S4-2), the chat management section 21 performs a message registration process (Step S4-3). Next, similarly to Step S1-4, the chat management section 21 performs the message display process (Step S4-4). The chat management section 21 returns to the message reception process (Step S4-1).

Figure 16:
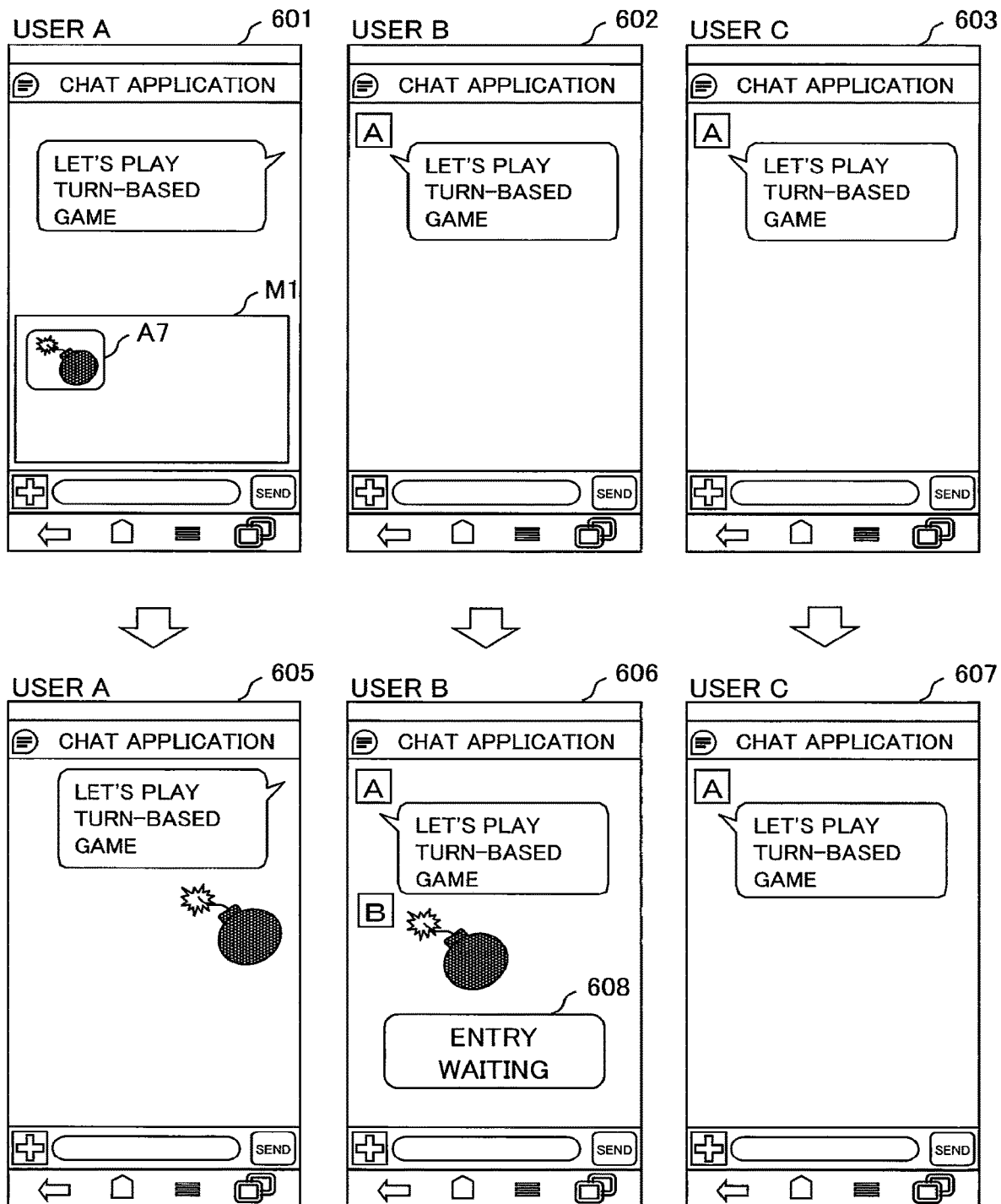
FIG. 16 is a diagram for describing exemplary views in the procedure of FIG. 15.

In this example, as illustrated in FIG. 16, it is assumed that the user A proposes the turn-based game. In this case, views 601, 602, and 603 are output in the touch panel displays of the user terminals 10 of the users A to C, respectively.

In the touch panel display of the user terminal 10 of the user A, an icon menu M1 for using the game icon is output. The user A selects a game icon A7 of "Dynamite" of the turn-based game. In a case where it is determined that the game icon has been selected ("YES" in Step S4-2), the chat management section 21 performs the entry responding process. In this example, first, the chat management section 21 performs a decision process for the order of entries of the participating user (Step S4-5). Specifically, the game management section 212 acquires the user IDs of the users who belong to the chat group in chatting from the user management section 22. Next, the game management section 212 generates and stores the game management table. In the game management table, the entry period is recorded in association with the icon ID and the chat group ID. The game management section 212 randomly determines the order of entries for the users who belong to the chat group. The game management section 212 records the determined order of entries in the data area of the entry attribute of the game management table. In the embodiment, the order of entries is an order of the users A, B, and C. Further, the game management section 212 records the number of times of entries (the initial value is "0") in the data area of the entry state of the game management table.

Next, the chat management section 21 performs the entry waiting process for the user of the next order (Step S4-6). Specifically, the game management section 212 identifies the user having the earliest order among the users having the smallest number of entries recorded in the content of entry of the game management table. The game management section 212 outputs an entry waiting view to the user terminal 10 of the user.

As illustrated in FIG. 16, in a case where the entry is detected in the user terminal 10 of the user A, views 605, 606, and 607 are output in the touch panel displays of the user terminals 10 of the users A to C, respectively. In this example, a message 608 of "Waiting for entry" is displayed on the touch panel display of the user terminal 10 of the user B in the rank next to the user A.

Next, the chat management section 21 performs the entry reception process (Step S4-7). Specifically, in a case where the entry is received from the user terminal 10 the entry of which has been waited for, the game management section 212 increases the number of times of entries of the data area of the entry state of the game management table.

Next, the chat management section 21 performs the random selection process on the received entry (Step S4-8). Specifically, the game management section 212 determines a sticker to be displayed among the sticker candidates recorded in the logic storage section 24. In this example, the game management section 212 generates a random value, and selects a sticker according to the random value. The game management section 212 records the selected sticker in the game management table in association with the number of times of entries.

Next, the chat management section 21 performs the message display process for displaying a randomly selected message (Step S4-9). Specifically, the game management section 212 registers the selected sticker in the message storage section 23 as a game message. The game management section 212 outputs the selected sticker in the touch panel display of each user terminal 10.

Next, the chat management section 21 performs the determination process on whether the content of entry matches with the end condition (Step S4-10). Specifically, the game management section 212 acquires the end condition from the logic storage section 24. The game management section 212 determines whether the content of entry recorded in the game management table matches with the end condition. In this example, it is assumed that the end condition is "End when the win-loss outcome is determined". Further, since the win-loss outcome has not been determined, the content of entry does not match with the end condition.

In a case where the end condition is not matched ("NO" in Step S4-10), the chat management section 21 returns to the entry waiting process for the user of the next order (Step S4-6).

Figure 17:
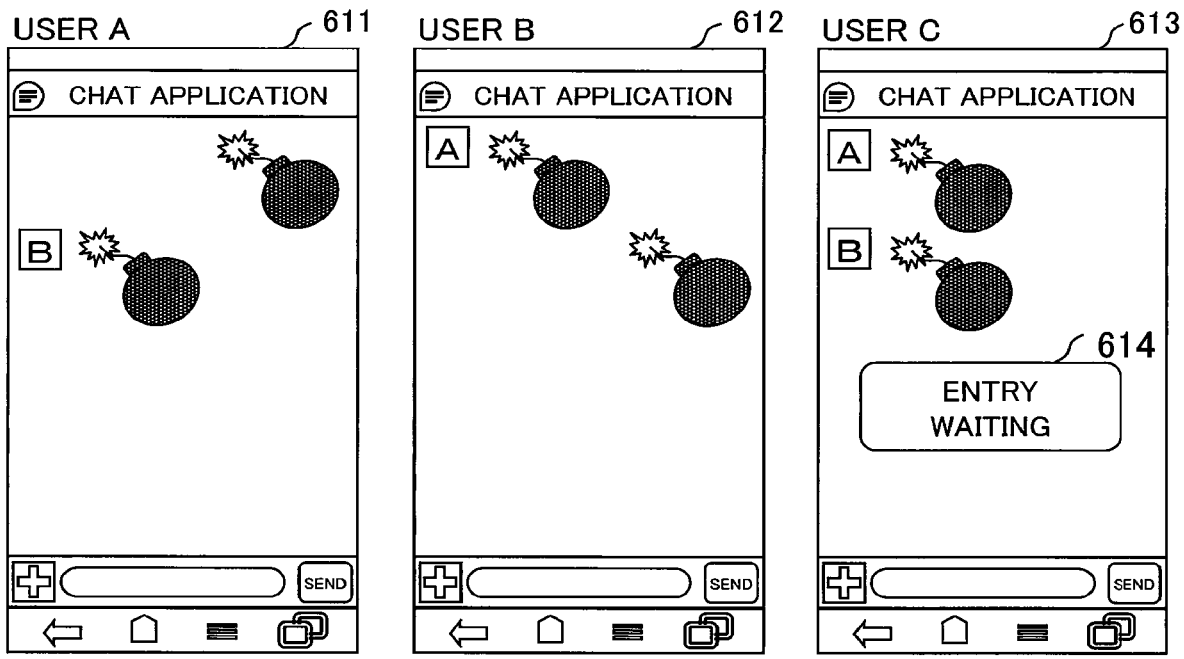
FIG. 17 is a diagram for describing exemplary views in the procedure of FIG. 15.
Figure 17:
Figure 17:
Figure 17:
Figure 17:
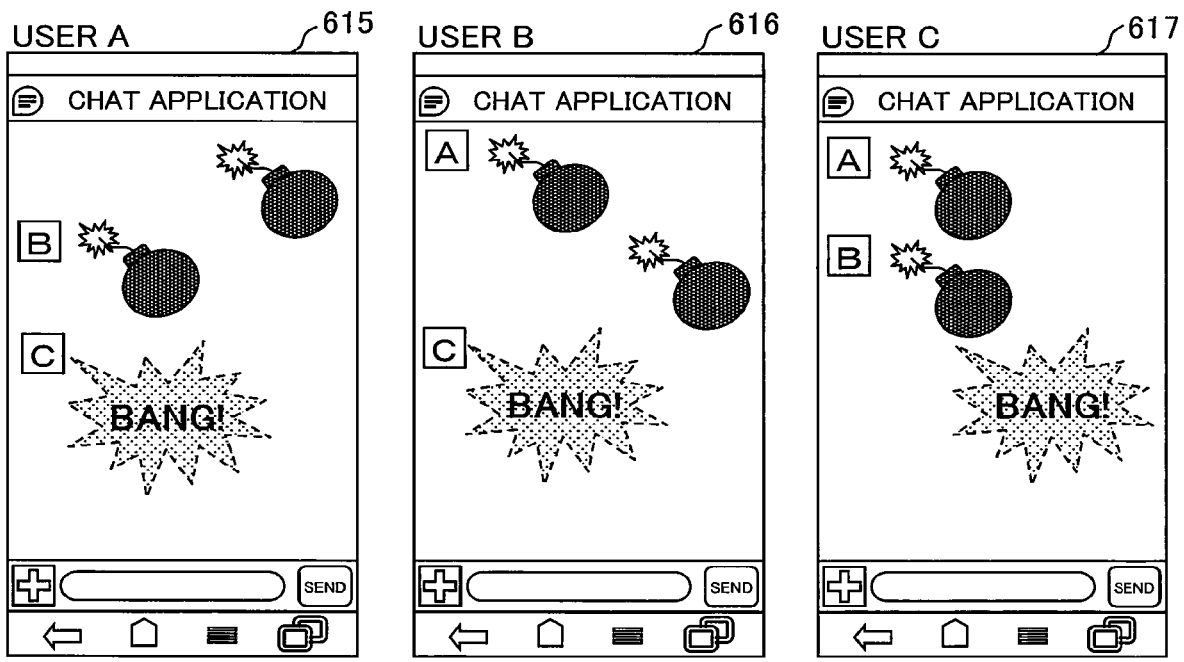

As illustrated in FIG. 17, in a case where the entry is detected in the user terminal 10 of the user B, views 611, 612, and 613 are output in the touch panel displays of the user terminals 10 of the users A to C, respectively. In this example, a message 614 of "Waiting for entry" is displayed on the touch panel display of the user terminal 10 of the user C in the rank next to the user B.

In a case where the entry is received from the user terminal 10 of the user C (Step S4-7), the game management section 212 performs the random selection process on the received entry according to the game logic recorded in the logic storage section 24 (Step S4-8). In this example, it is assumed that an "Explosion" sticker has been selected according to the generated random value. In this case, the content of entry matches with the end condition.

In a case where it is determined that the content of entry matches with the end condition ("YES" in Step S4-10), similarly to Step S2-10, the chat management section 21 performs the result display process (Step S4-11). In this case, views 615, 616, and 617 are output in the touch panel displays of the user terminals 10 of the users A to C, respectively. The chat management section 21 ends the entry responding process. In this way, it is possible to play the game through the chat message.

According to the fourth embodiment, the following advantages are achieved in addition to the above advantages (1) to (5):

(7) The chat management section 21 performs the decision process of the order of entries of the participating user (Step S4-5). The chat management section 21 performs the entry waiting process for the user of the next order (Step S4-6). Therefore, it is possible to gain entry while determining the order.

In addition, the fourth embodiment may be modified. For example, in the fourth embodiment, the chat management section 21 performs the entry waiting process for the user of the next order (Step S4-6). Herein, a time limit may be set in the entry waiting process. In this case, the chat management section 21 may perform the entry waiting process for the user of the next order only for the time limit in Step S4-6. Further, in a case where the entry has not been received within the time limit, the user may be determined as "Pass (skip of entry)" or "Dropping-out" from the game. In this case, the game management section 212 records the number of pass times and the dropping-out in the data area of the entry state of the game management table in association with the user ID.

In the fourth embodiment, the chat management section 21 performs the random selection process on the received entry (Step S4-8). Herein, the chat management section 21 may select a sticker candidate based on timing of the entry. For example, in a case where the game icon has been selected, the sticker candidates are sequentially selected, and the sticker candidate selected at timing of the entry may be used as the sticker.

Again, the number of participating users and the shape of the sticker of the above embodiment are not limited to the above configurations.

Next, a fifth embodiment will be described with reference to FIGS. 18 to 20. The fifth embodiment is different from the first and second embodiments only in that the game logic is changed. For purposes of brevity, the details of the same portions as those of the first and second embodiments will not be repeated. The outline of a time-limited turn processing flow will be described. Specifically, it is assumed that the users A and B who belong to the same chat group play a game in which the match is determined by whether the entry is gained within a predetermined time (the timer limit).

Figure 18:
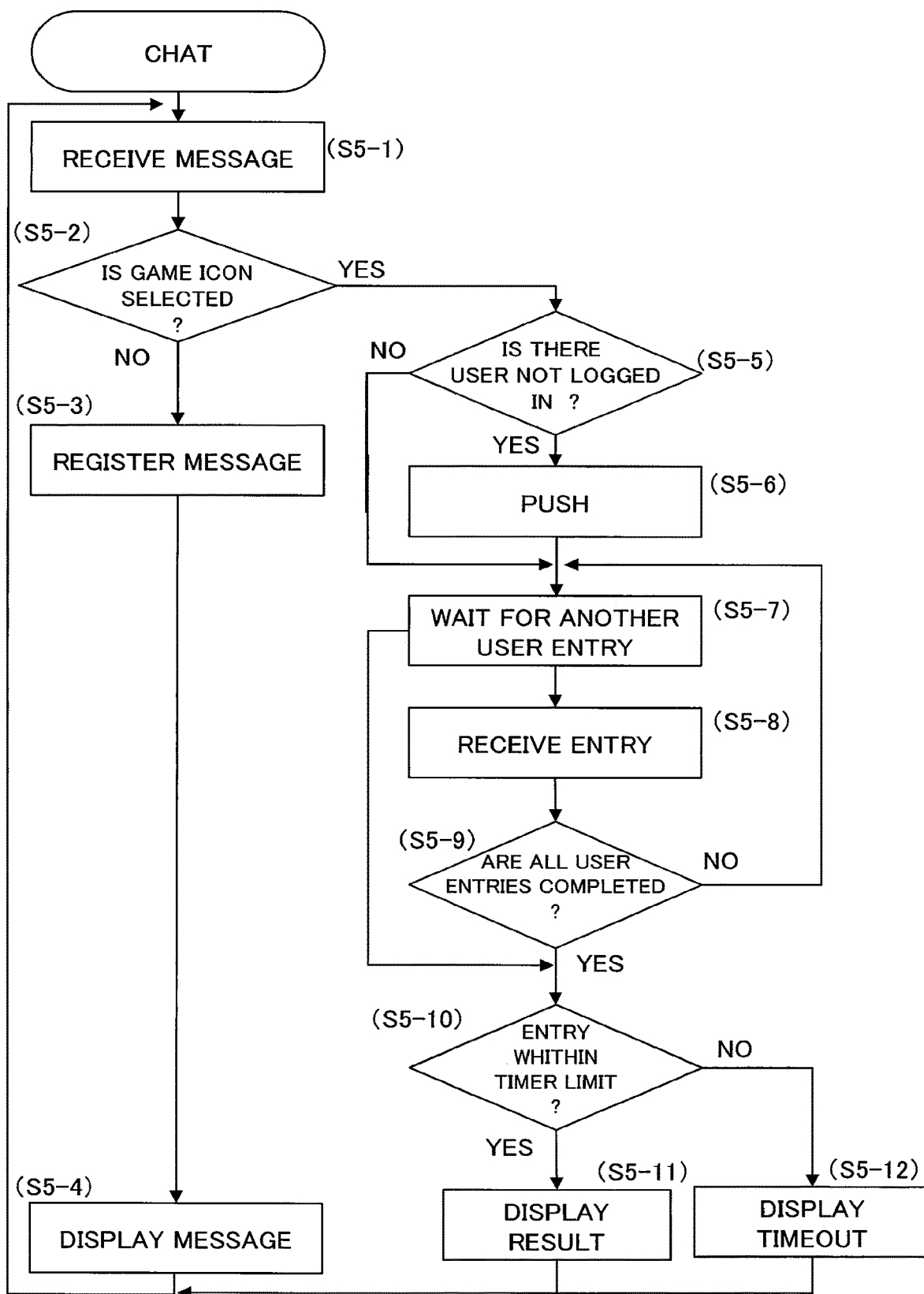
FIG. 18 is a diagram for describing a procedure of the system of FIG. 1 according to a fifth embodiment.

Herein, as illustrated in FIG. 18, similarly to Step S1-1, the chat management section 21 first performs the message reception process (Step S5-1).

Next, similarly to Step S1-2, the chat management section 21 performs the determination process on whether the game icon has been selected (Step S5-2).

In this example, similarly to Step S1-3, in a case where it is determined that the type of the message is not the selection of the game icon ("NO" in Step S5-2), the chat management section 21 performs a message registration process (Step S5-3).

Next, similarly to Step S1-4, the chat management section 21 performs the message display process (Step S5-4). The chat management section 21 returns to the message reception process (Step S5-1).

Figure 19:
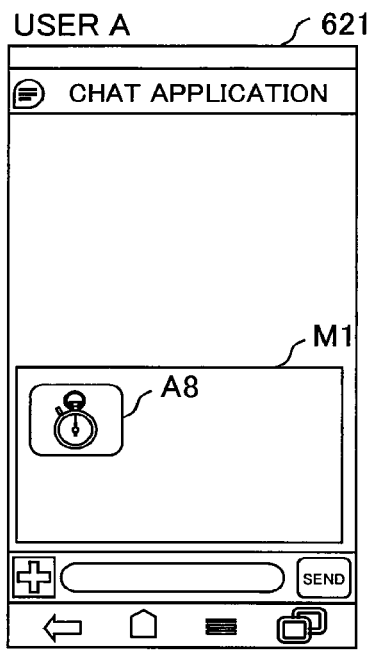
FIG. 19 is a diagram for describing exemplary views in the procedure of FIG. 18.
Figure 19:
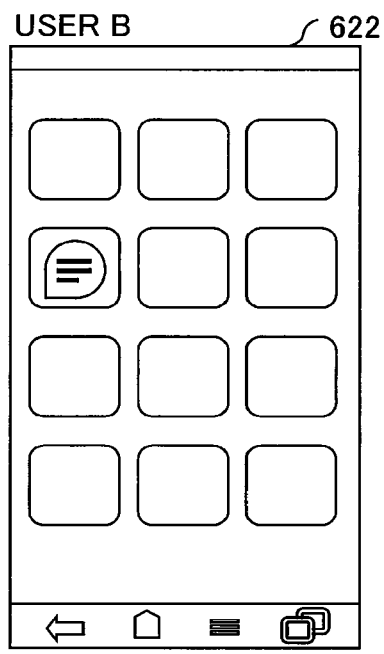
Figure 19:
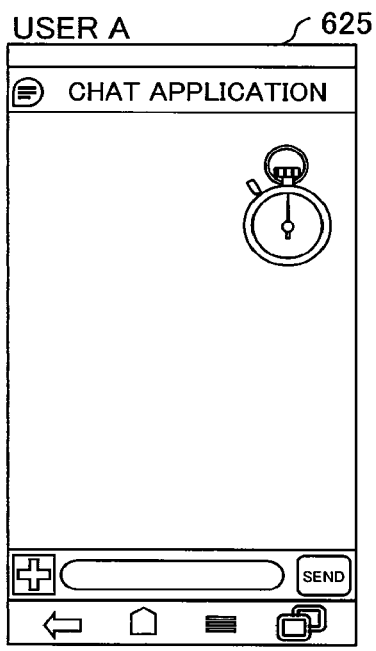
Figure 19:
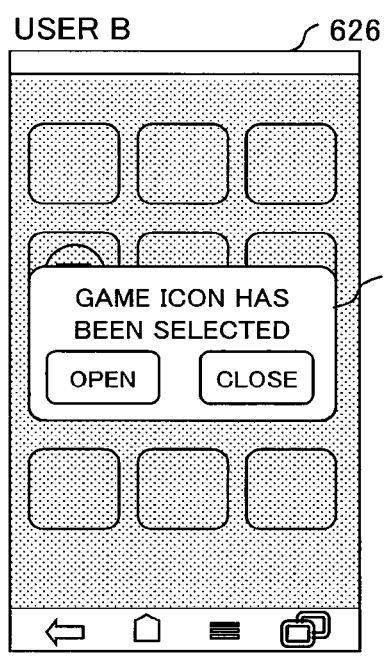

As illustrated in FIG. 19, it is assumed that the user A proposes a timer game to the user B who has not logged in the chat (that is, a non-login user). In this case, views 621 and 622 are output in the touch panel displays of the user terminals 10 of the users A and B, respectively. In this example, the view 622 is output as an initial menu view in the touch panel display of the user terminal 10 of the user B.

The icon menu M1 is output in the touch panel display of the user terminal 10 of the user A in order to use the game icon. The user A selects a game icon A8 of "Timer". In this case, the game management section 212 sets a short timer limit relative to the entry period. In other words, the game management section 212 sets the timer limit such that the timer limit expires even before the entry period expires.

In a case where it is determined that the game icon has been selected ("YES" in Step S5-2), the chat management section 21 performs the entry responding process. First, the chat management section 21 performs the determination process on whether there is a non-login user in the chat group (Step S5-5). Specifically, the game management section 212 identifies a login state of each user who belongs to the chat group.

In a case where it is determined that there is a non-login user in the chat group ("YES" in Step S5-5), the chat management section 21 performs a push process (Step S5-6). Specifically, the game management section 212 transmits a push notification to the user terminal 10 of the non-login user.

In this case, as illustrated in FIG. 19, views 625 and 626 are output in the touch panel displays of the user terminals 10 of the users A and B, respectively. Herein, a push notification message 627 such as a dialog box is displayed on the touch panel display of the user terminal 10 of the user B who has not logged in the chat. In the push notification message 627, "Open" and "Close" buttons are included. When the "Close" button is selected in the user terminal 10 of the user B, the push notification message 627 is closed. On the other hand, when the "Open" button is selected, the user terminal 10 of the user B logs in the chat.

In addition, in a case where it is determined that all the users in the chat group have logged in, that is, there is no non-login user ("NO" in Step S5-5), the chat management section 21 skips the push process (Step S5-6).

Next, the chat management section 21 performs the entry waiting process for another user (Step S5-7). The entry waiting process is performed using the entry period apart from the timer limit.

Next, the chat management section 21 performs the entry reception process similarly to Step S2-6 (Step S5-8).

Figure 20:
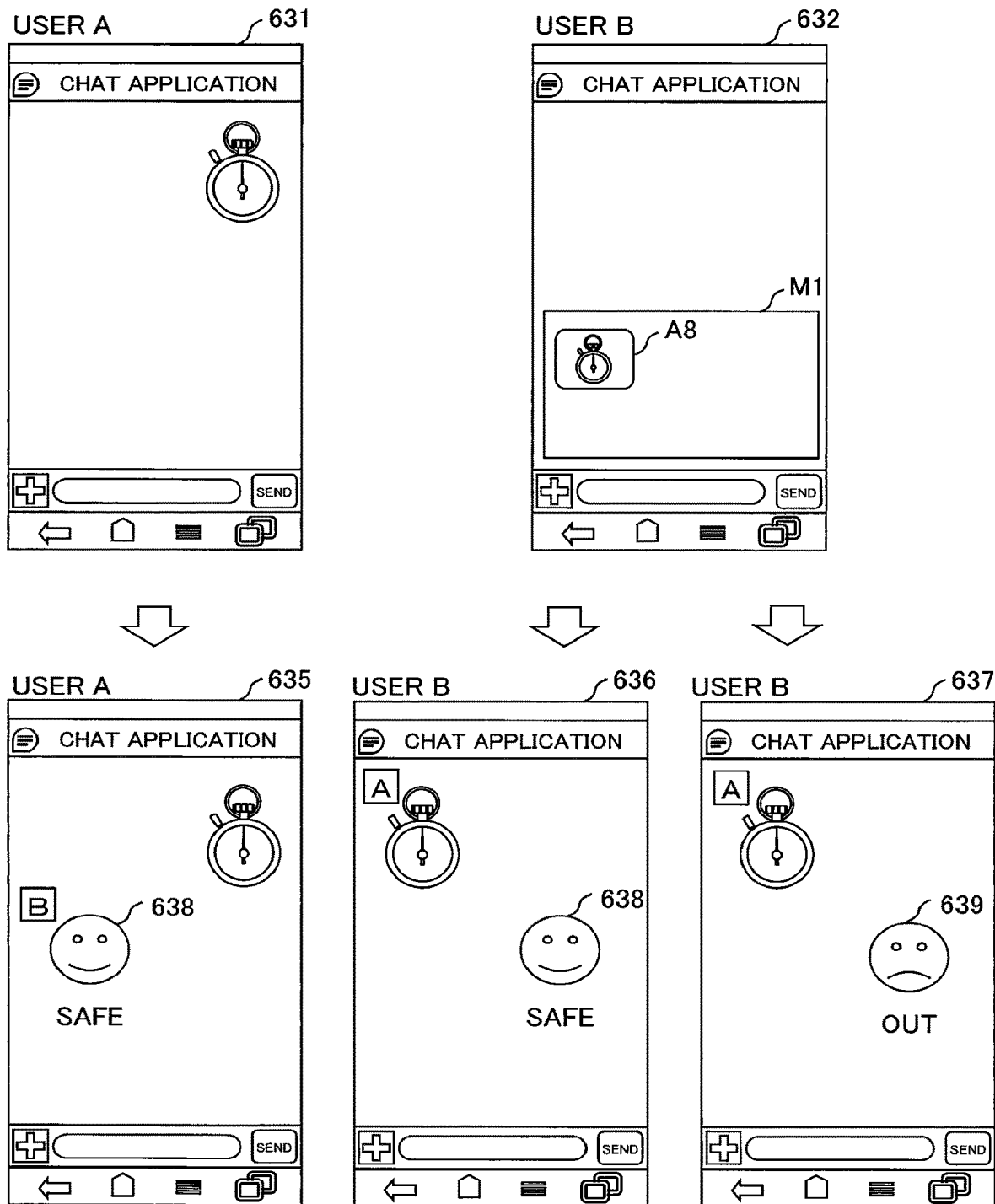
FIG. 20 is a diagram for describing exemplary views in the procedure of FIG. 18.

In this example, as illustrated in FIG. 20, views 631 and 632 are output in the touch panel displays of the user terminals 10 of the users A and B, respectively. The icon menu M1 is output in the touch panel display of the user terminal 10 of the user B. The user B selects the game icon A8 of "Timer".

Next, similarly to Step S2-9, the chat management section 21 performs the determination process on whether all the users have completed the entries (Step S5-9).

In a case where it is determined that any one of the users has not gained entry ("NO" in Step S5-9), the chat management section 21 returns to the entry waiting process (Step S5-7).

In a case where it is determined that the entry period has ended (Step S5-7) or all the users have completed the entries ("YES" in Step S5-9), the chat management section 21 performs the determination process on whether there is an entry within the timer limit (Step S5-10). Specifically, the game management section 212 compares the time of entry with the time corresponding to the timer limit.

In a case where it is determined that there is an entry within the timer limit ("YES" in Step S5-10), the chat management section 21 performs the result display process (Step S5-11). Specifically, the game management section 212 outputs a message indicating that there has been an entry within the timer limit in the touch panel displays of the user terminals 10 of the users A and B.

In contrast, in a case where it is determined that there is no entry within the timer limit ("NO" in Step S5-10), the chat management section 21 performs a timer-out display process (Step S5-12). Specifically, the game management section 212 outputs a message indicating that the entry is not made within the timer limit in the touch panel displays of the user terminals 10 of the users A and B. The chat management section 21 ends the entry responding process.

As illustrated in FIG. 20, in a case where the chat management section 21 determines that there is an entry within the timer limit ("YES" in Step S5-10), views 635 and 636 are output in the touch panel display of the user terminals 10 of the users A and B, respectively. In each view, a sticker 638 is displayed to indicate that the entry of the user B is made within the timer limit. In a case where the chat management section 21 determines that there is no entry within the timer limit ("NO" in Step S5-10), a view 637 is output in the touch panel display of the user terminal 10 of the user B. In the view, a sticker 639 is displayed to indicate that the entry of the user B is not made within the timer limit. In this case, the sticker 639 is also displayed on the touch panel display of the user terminal 10 of the user A instead of the sticker 638.

According to the fifth embodiment, the following advantages are achieved in addition to the above advantages (1), (3), (4), and (6):

(8) In a case where it is determined that there is a non-login user in the chat group ("YES" in Step S5-5), the chat management section 21 performs the push process (Step S5-6). Therefore, it is possible to urge the non-login user to gain entry.

(9) The chat management section 21 performs the determination process on whether there is an entry within the timer limit (Step S5-10). The chat management section 21 changes an outputting message according to whether there is an entry within the timer limit (Steps S5-11 and S5-12). Therefore, it is possible to achieve rapid communications.

In addition, the fifth embodiment may be modified. For example, in the fifth embodiment, the user selects the game icon A8 of "Timer." In this case, the game management section 212 sets a shorter timer limit than the entry period. A method of setting the timer limit is not limited to the above configuration. For example, the user (in this example, the user A) who proposes the game may set a desired time as the timer limit. In this case, when the game icon is selected in the user terminal 10 of the user A, the chat management section 21 urges the user terminal 10 to input a time, and sets the input time to the timer limit.

Further, in Step S5-10, the chat management section 21 may determine whether there is an entry within the timer limit based on an elapsed time since the login. In this case, the elapsed time since the user logs in is measured.

Next, a sixth embodiment will be described with reference to FIGS. 21 to 24. The sixth embodiment is different from the first and second embodiments only in that the game logic is changed. For purposes of brevity, the details of the same portions as those of the first and second embodiments will not be repeated. The outline of a processing flow of grouping the users in the chat group will be described. Specifically, it is assumed that four or more the users A, B, and C belonging to the same chat group are grouped into a plurality of groups (in this example, two groups).

Figure 21:
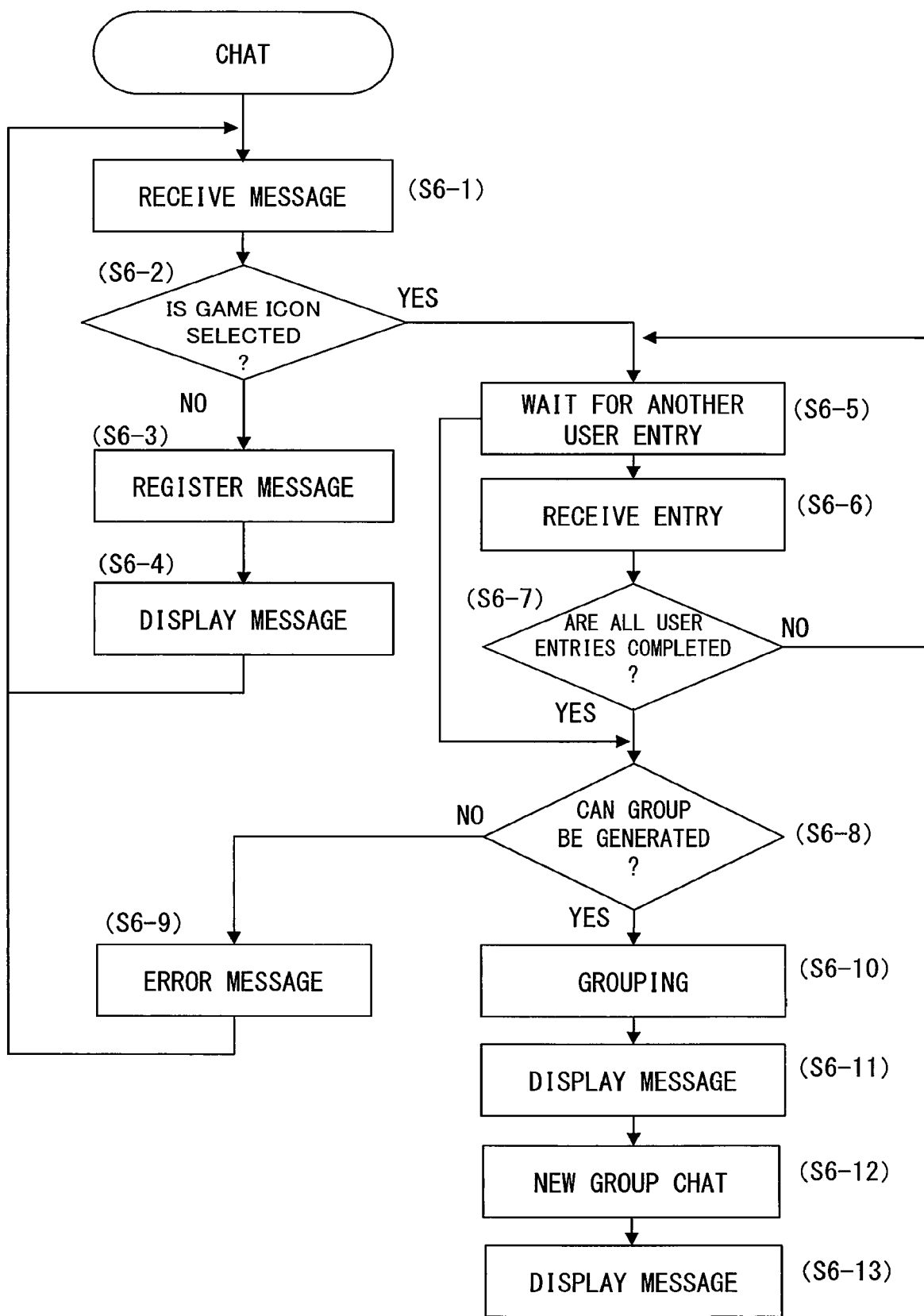
FIG. 21 is a diagram for describing a procedure of the system of FIG. 1 according to a sixth embodiment.

As illustrated in FIG. 21, first, similarly to Step S1-1, the chat management section 21 first performs the message reception process (Step S6-1). Next, similarly to Step S1-2, the chat management section 21 performs the determination process on whether the game icon has been selected (Step S6-2). Similarly to Step S1-3, in a case where it is determined that the type of the message is not the selection of the game icon ("NO" in Step S6-2), the chat management section 21 performs a message registration process (Step S6-3). Next, similarly to Step S1-4, the chat management section 21 performs the message display process (Step S6-4). The chat management section 21 returns to the message reception process (Step S6-1).

Figure 22:
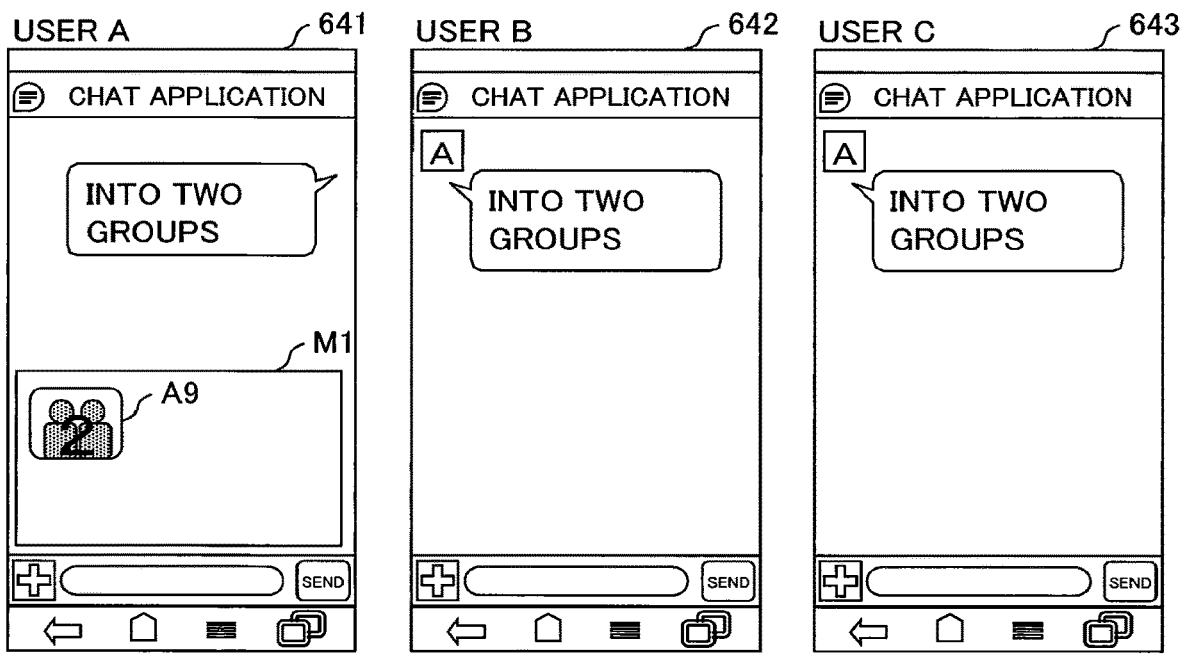
FIG. 22 is a diagram for describing exemplary views in the procedure of FIG. 21.

In this example, as illustrated in FIG. 22, it is assumed the user A proposes the grouping game. In this case, views 641, 642, and 643 are output in the touch panel displays of the user terminals 10 of the users A, B, and C, who are part of the chat group, respectively.

In the touch panel display of the user terminal 10 of the user A, an icon menu M1 for using the game icon is output. The user A selects a game icon A9 of "Grouping." In a case where it is determined that the game icon has been selected ("YES" in Step S6-2), the chat management section 21 performs the entry responding process. Similarly to Step S2-5, the chat management section 21 first performs the entry waiting process for another user (Step S6-5).

As illustrated in FIG. 22, views 645, 646, and 647 are output in the touch panel displays of the user terminals 10 of the users A to C, respectively. In this example, a standby message 648 is output in the touch panel display of the user terminal 10 of another user who has not gained entry. The standby message 648 includes the time left until the entry period expires and buttons for selecting "Participation" and "Non-participation" with respect to the grouping.

Next, the chat management section 21 performs the entry reception process similarly to Step S2-6 (Step S6-6). Specifically, the game management section 212 records "Participation" or "Non-participation" selected in association with the user ID in the game management table.

Next, similarly to Step S2-9, the chat management section 21 performs the determination process on whether all the users have completed the entries (Step S6-7). In a case where it is determined that any one of the users has not gained entry ("NO" in Step S6-7), the chat management section 21 returns to the entry waiting process (Step S6-5).

Figure 23:
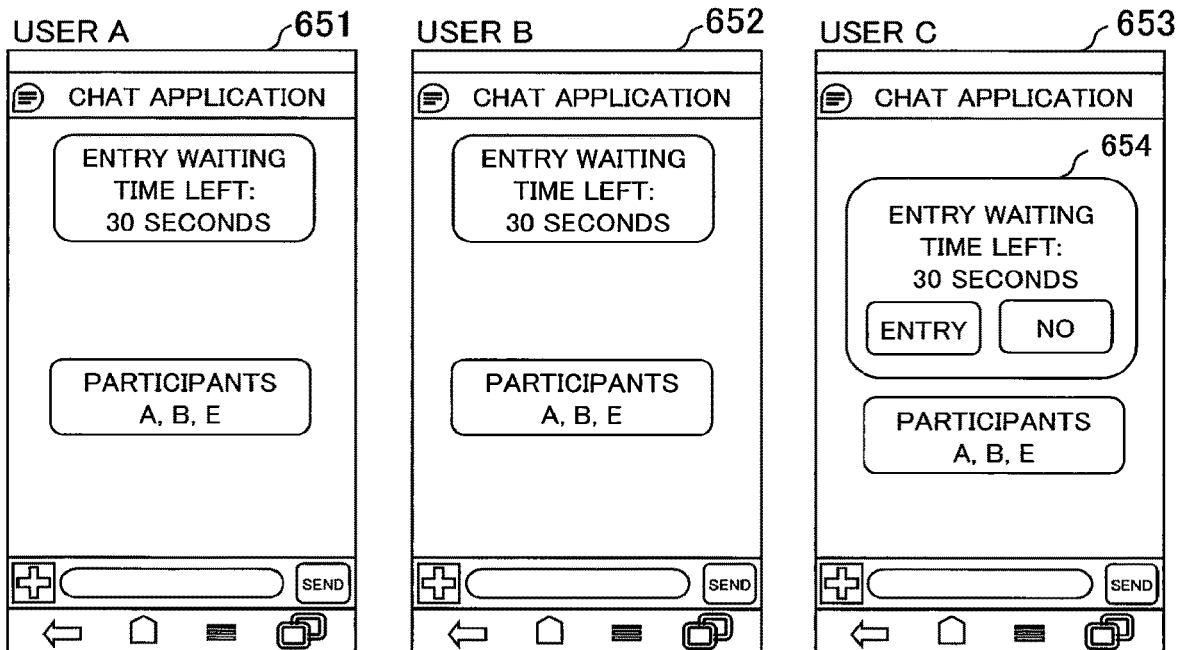
FIG. 23 is a diagram for describing exemplary views in the procedure of FIG. 21.
Figure 23:
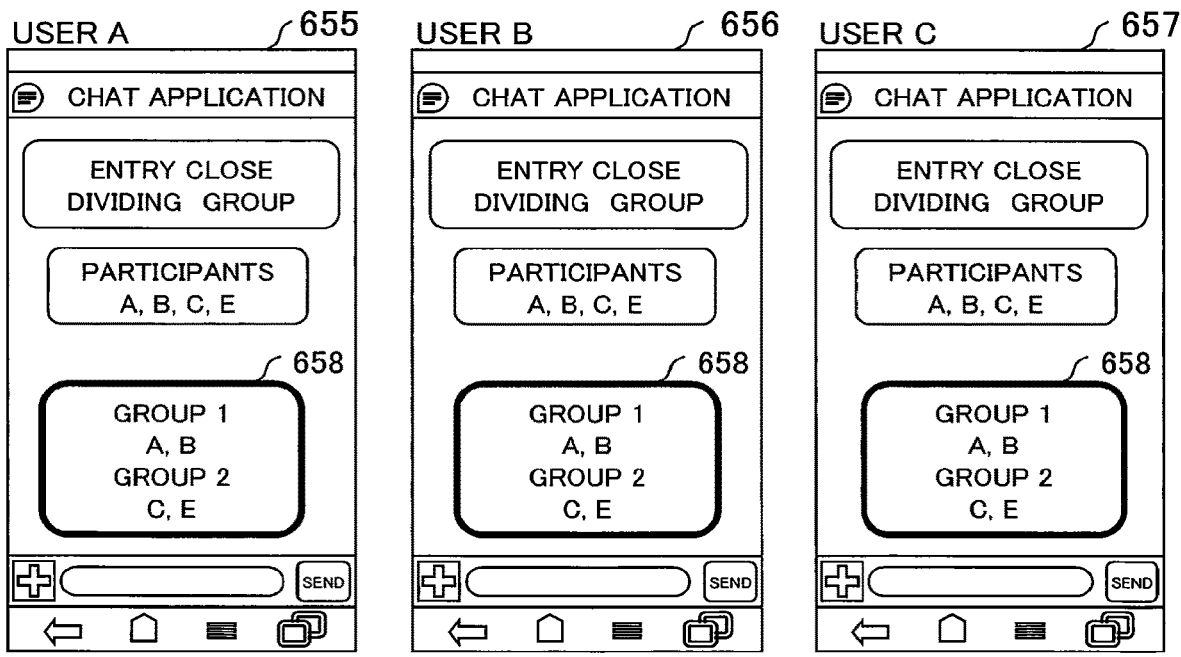

Herein, as illustrated in FIG. 23, in a case where "Participation" is selected in the user terminal 10 of the user B, views 651, 652, and 653 are output in the touch panel displays of the users A to C, respectively. Even in this case, a standby message 654 is output in the touch panel display of the user terminal 10 of another user (in this example, the user C) who has not gained entry.

In a case where it is determined that the entry period has ended (Step S6-5) or all the users have completed the entries ("YES" in Step S6-7), the chat management section 21 performs the determination process on whether it is possible to generate a group (Step S6-8). Specifically, the game management section 212 acquires the number of groups based on the game logic recorded in the logic storage section 24. The game management section 212 acquires the number of user IDs associated with "Participation" with reference to the game management table, and compares the number of users (the number of entries) expressing "Participation" with the number of groups. In a case where the number of entries is equal to or larger than two times the number of groups, the chat management section 21 determines that it is possible to generate a group.

In a case where it is determined that it is not possible to generate a group due to an insufficient number of entries ("NO" in Step S6-8), the chat management section 21 performs an error message process (Step S6-9). Specifically, the game management section 212 outputs a message indicating the fact that it is not possible to generate a group to each user terminal 10 which belongs to the chat group. The procedure returns to the process of Step S6-1.

On the other hand, in a case where the number of entries is enough to generate a group ("YES" in Step S6-8), the chat management section 21 performs a grouping process (Step S6-10). Specifically, the game management section 212 identifies the user IDs recorded with "Participation" using the game management table. The game management section 212 divides the user IDs into groups as many as the number of groups. For example, a random value is assigned to each user ID, and the users can be grouped in a descending order of the assigned random values.

Next, the chat management section 21 performs the message display process (Step S6-11). Specifically, the game management section 212 outputs a message indicating the grouping result to each user terminal 10. The chat management section 21 ends the entry responding process.

Herein, as illustrated in FIG. 23, views 655, 656, and 657 are output in the touch panel display of the user terminals 10 of the users A to C, respectively. In each view, a message 658 indicating the grouping result is displayed.

Next, the chat management section 21 performs a new group chat process (Step S6-12). Specifically, the game management section 212 generates a new chat group (sub-group) using the user IDs belonging to each group, and registers the new chat group in the user management section 22.

Figure 24:
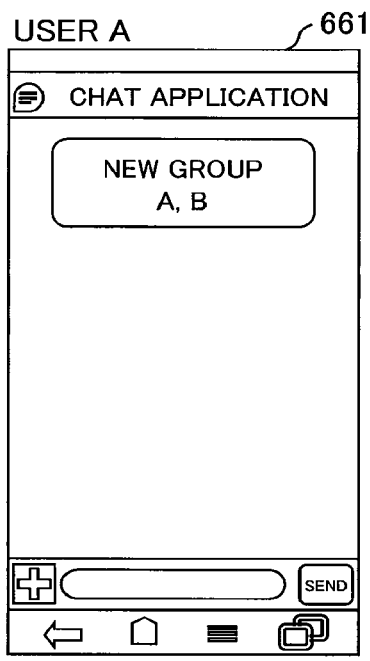
FIG. 24 is a diagram for describing exemplary views in the procedure of FIG. 21.
Figure 24:
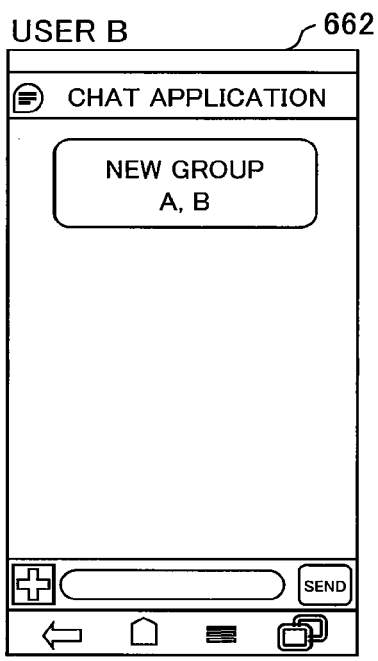
Figure 24:
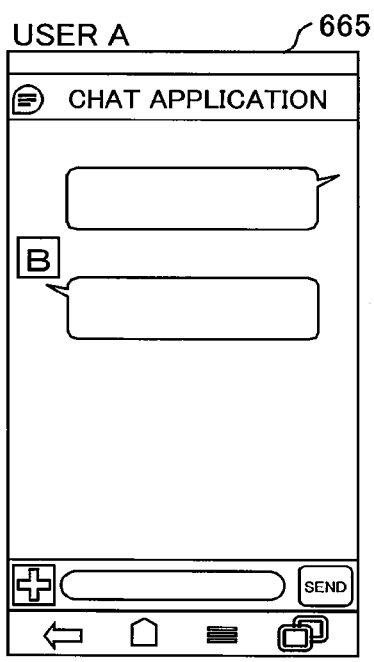
Figure 24:
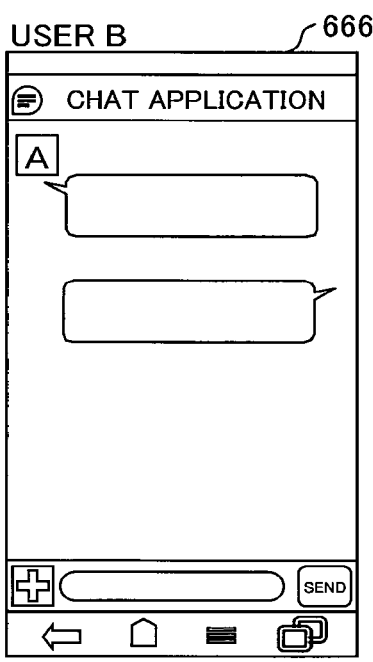

In this case, as illustrated in FIG. 24, view 661 and 662 are output in the touch panel displays of the user terminals 10 of the users A and B, respectively. In addition, the user terminals 10 of the users C and E who do not belong to the sub-group are not allowed to read the message of the users A and B.

Next, the chat management section 21 performs the message display process (Step S6-13). Specifically, the game management section 212 outputs the corresponding chat view (timeline view) to each sub-group.

In this case, as illustrated in FIG. 24, views 665 and 666 are output in the touch panel displays of the user terminals 10 of the users A and B, respectively. In this example, a message is exchanged between the users A and B.

According to the sixth embodiment, the following advantages are achieved in addition to the above advantages (1) to (4), and (6):

(10) In a case where it is determined that the entry period has ended (Step S6-5) or all the users have completed the entries ("YES" in Step S6-7), the chat management section 21 performs the determination process on whether it is possible to generate a group (Step S6-8). In a case where it is determined that it is not possible to generate a group due to an insufficient number of entries ("NO" in Step S6-8), the chat management section 21 performs an error message process (Step S6-9). Therefore, in a case where the grouping is not performed, the chat can continue in the original chat group.

(11) In a case where there are a number of entries enough to generate a group ("YES" in Step S6-8), the chat management section 21 performs a grouping process (Step S6-10). Therefore, it is possible to efficiently perform the grouping while using the chat.

(12) The chat management section 21 performs the new group chat process (Step S6-12). Therefore, it is possible to make communication for every sub-group, that is, independent of other sub-groups.

In addition, the sixth embodiment may be modified. For example, in the sixth embodiment, the chat management section 21 performs the new group chat process (Step S6-12). The use of the grouping result is not limited to the generating of the new chat group. The grouping result is handed over to another game application so as to allow the game to be played between the sub-groups.

In the sixth embodiment, the grouping is made into two groups, but the number of groups is not limited thereto.

What is claimed is:

1. A game control method comprising:
    transmitting, to terminals of a plurality of users, data for displaying a chat screen comprising a game icon for entry to a game and one or more messages sent from at least a part of the plurality of users;
    causing display of the game icon in the chat screen on a terminal of a first user of the plurality of users;
    in response to selection of the game icon by the first user, transmitting, to the terminal of the first user, data for displaying a waiting message indicating waiting for an entry of another user to the game in the chat screen, and
    transmitting, to terminals other than the terminal of the first user, data for displaying an icon for the entry to the game in the chat screen;
    in response to the icon for the entry to the game being selected by a second user other than the first user, receiving the entry of the second user;
    when a number of a group associated with the game icon and a number of users who have entered the game satisfy a first relationship, transmitting, to at least a part of the terminals of the plurality of users, data for displaying a player group including at least the first user and the second user who has entered the game in the chat screen;
    conducting a battle by the player group; and
    transmitting, to at least part of the terminals of the plurality of users, data for displaying a result of the battle in the chat screen.

2. The method of claim 1, wherein in transmitting the data for displaying the player group, the data is transmitted to all of the terminals of the plurality of users.

3. The method of claim 1, wherein the one or more messages are displayed in chronological order in the chat screen.

4. The method of claim 1, wherein the game icon is located under the one or more messages.

5. The method of claim 1, further comprising receiving a first message from the terminal of the first user, wherein
    in the chat screen displayed on the terminal of the first user, the first message is displayed in a first balloon that is right justified and has a tail pointing right in the chat screen, and
    in the chat screen displayed on terminals of users other than the first user, the first message is displayed in a second balloon that is left justified and has a tail pointing left in the chat screen, the second balloon being associated with the first user.

6. The method of claim 1, wherein the number of the group is two.

7. A game control device, comprising:
    circuitry configured to:
    transmit, to terminals of a plurality of users, data for displaying a chat screen comprising a game icon for entry to a game and one or more messages sent from at least a part of the plurality of users,
    cause display of the game icon in the chat screen on a terminal of a first user of the plurality of users,
    in response to selection of the game icon by the first user, transmit, to the terminal of the first user, data for displaying a waiting message indicating waiting for an entry of another user to the game in the chat screen, and
    transmit, to terminals other than the terminal of the first user, data for displaying an icon for the entry to the game in the chat screen,
    in response to the icon for the entry being selected by a second user other than the first user, receive the entry of the second user,
    when a number of a group associated with the game icon and a number of users who have entered the game satisfy a first relationship, transmit, to at least a part of the terminals of the plurality of users, data for displaying a player group including the first user and the second user who has entered the game in the chat screen,
    conduct a battle by the player group, and
    transmit to at least part of the terminals of the plurality of users, data for displaying a result of the battle in the chat screen.

8. The game control device of claim 7, wherein in transmitting the data for displaying the player group, the circuitry is configured to transmit the data to all of the terminals of the plurality of users.

9. The game control device of claim 7, wherein the one or more messages are displayed in chronological order in the chat screen.

10. The game control device of claim 7, wherein the game icon is located under the one or more messages.

11. The game control device of claim 7, wherein
    the circuitry is further configured to receive a first message from the terminal of the first user,
    in the chat screen displayed on the terminal of the first user, the first message is displayed in a first balloon that is right justified and has a tail pointing right in the chat screen, and
    in the chat screen displayed on terminals of users other than the first user, the first message is displayed in a second balloon that is left justified and has a tail pointing left in the chat screen, the second balloon being associated with the first user.

12. The game control device of claim 7, wherein the number of the group is two.

13. A non-transitory computer-readable medium encoded with computer-readable instructions that, when executed by a computer, cause the computer to perform a method comprising:
    transmitting, to terminals of a plurality of users, data for displaying a chat screen comprising a game icon for entry to a game and one or more messages sent from at least a part of the plurality of users;
    causing display of the game icon in the chat screen on a terminal of a first user of the plurality of users;
    in response to selection of the game icon by the first user,
        transmitting, to the terminal of the first user, data for displaying a waiting message indicating waiting for an entry of another user to the game in the chat screen, and
        transmitting, to terminals other than the terminal of the first user, data for displaying an icon for the entry to the game in the chat screen;
    in response to the icon for the entry to the game being selected by a second user other than the first user, receiving the entry of the second user;
    when a number of a group associated with the game icon and a number of users who have entered the game satisfy a first relationship, transmitting, to at least a part of the terminals of the plurality of users, data for displaying a player group composed of users including the first user and the second user who has entered the game in the chat screen;
    conducting a battle by the player group; and
    transmitting, to at least part of the terminals of the plurality of users, data for displaying a result of the battle in the chat screen.

14. The non-transitory computer-readable medium of claim 13, wherein in transmitting the data for displaying the player group, the data is transmitted to all of the terminals of the plurality of users.

15. The non-transitory computer-readable medium of claim 13, wherein the one or more messages are displayed in chronological order in the chat screen.

16. The non-transitory computer-readable medium of claim 13, wherein the game icon is located under the one or more messages.

17. The non-transitory computer-readable medium of claim 13, further comprising receiving a first message from the terminal of the first user, wherein
    in the chat screen displayed on the terminal of the first user, the first message is displayed in a first balloon that is right-justified and has a tail pointing right in the chat screen, and
    in the chat screen displayed on terminals of users other than the first user, the first message is displayed in a second balloon that is left justified and has a tail pointing left in the chat screen, the second balloon being associated with the first user.

18. The non-transitory computer-readable medium of claim 13, wherein the number of the group is two.

* * * * *